(12) United States Patent
Shrestha et al.

(10) Patent No.: US 12,088,393 B2
(45) Date of Patent: Sep. 10, 2024

(54) BEAM AND NARROWBAND MANAGEMENT

(71) Applicant: QUALCOMM Incorporated, San Diego, CA (US)

(72) Inventors: Bharat Shrestha, San Diego, CA (US); Mungal Singh Dhanda, Slough (GB); Umesh Phuyal, San Diego, CA (US); Xiao Feng Wang, San Diego, CA (US); Alberto Rico Alvarino, San Diego, CA (US); Ayan Sengupta, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/450,920

(22) Filed: Oct. 14, 2021

(65) Prior Publication Data
US 2022/0131594 A1 Apr. 28, 2022

Related U.S. Application Data

(60) Provisional application No. 63/198,490, filed on Oct. 22, 2020.

(51) Int. Cl.
| | |
|---|---|
| *H04B 7/08* | (2006.01) |
| *H04W 48/16* | (2009.01) |
| *H04W 72/23* | (2023.01) |
| *H04W 74/0833* | (2024.01) |

(52) U.S. Cl.
CPC ............ *H04B 7/088* (2013.01); *H04W 48/16* (2013.01); *H04W 72/23* (2023.01); *H04W 74/0833* (2013.01)

(58) Field of Classification Search
CPC ...... H04B 7/088; H04W 72/23; H04W 48/16; H04W 74/0833
See application file for complete search history.

(56) References Cited

U.S. PATENT DOCUMENTS

| | | | |
|---|---|---|---|
| 10,397,924 B2 * | 8/2019 | Hussain | H04W 72/0453 |
| 10,517,074 B2 * | 12/2019 | Park | H04L 5/0053 |
| 10,554,293 B1 * | 2/2020 | Chin | H04W 56/0065 |

(Continued)

FOREIGN PATENT DOCUMENTS

| | | | | |
|---|---|---|---|---|
| CN | 107528671 A | * | 12/2017 | H04L 1/0056 |
| WO | WO-2017083489 A1 | | 5/2017 | |

(Continued)

OTHER PUBLICATIONS

International Search Report and Written Opinion—PCT/US2021/071907—ISA/EPO—Jan. 26, 2022.

*Primary Examiner* — Michael J Moore, Jr.
(74) *Attorney, Agent, or Firm* — Harrity & Harrity, LLP

(57) ABSTRACT

Various aspects of the present disclosure generally relate to wireless communication. In some aspects, a user equipment (UE) may select, while operating using a first beam corresponding to a cell, a second beam corresponding to the cell based at least in part on a set of beam information associated with the second beam, wherein a first narrowband is associated with the first beam and a second narrowband is associated with the second beam. The UE may communicate with a wireless communication device that provides the cell using the second beam. Numerous other aspects are provided.

30 Claims, 11 Drawing Sheets

(56) References Cited

U.S. PATENT DOCUMENTS

| | | | | |
|---|---|---|---|---|
| 11,722,215 | B1* | 8/2023 | Bhaskar | H04W 80/02 |
| | | | | 370/316 |
| 2017/0303263 | A1* | 10/2017 | Islam | H04L 5/0048 |
| 2018/0014175 | A1* | 1/2018 | Desai | H04W 48/16 |
| 2018/0376501 | A1* | 12/2018 | John Wilson | H04W 72/23 |
| 2019/0165983 | A1* | 5/2019 | Nakayama | H04W 72/0446 |
| 2019/0190591 | A1 | 6/2019 | Wang et al. | |
| 2019/0363843 | A1* | 11/2019 | Gordaychik | H04L 1/08 |
| 2019/0394770 | A1* | 12/2019 | Wang | H04W 56/0055 |
| 2020/0052782 | A1 | 2/2020 | Wang et al. | |
| 2020/0099858 | A1 | 3/2020 | Lee et al. | |
| 2020/0245378 | A1* | 7/2020 | Dhanda | H04W 4/70 |
| 2020/0314912 | A1 | 10/2020 | Wang et al. | |
| 2020/0344739 | A1* | 10/2020 | Rofougaran | H04W 56/0015 |
| 2020/0359322 | A1* | 11/2020 | Hwang | H04L 27/2602 |
| 2021/0227442 | A1* | 7/2021 | Yiu | H04W 36/00837 |
| 2021/0227490 | A1* | 7/2021 | Yiu | H04W 48/12 |
| 2022/0022146 | A1* | 1/2022 | Sengupta | H04B 7/0695 |
| 2022/0078848 | A1* | 3/2022 | Hu | H04W 72/046 |
| 2022/0085874 | A1* | 3/2022 | Shrestha | H04W 36/08 |
| 2022/0131594 | A1* | 4/2022 | Shrestha | H04B 7/088 |
| 2022/0132383 | A1* | 4/2022 | Shrestha | H04W 36/0061 |
| 2022/0338146 | A1* | 10/2022 | Sha | H04W 48/10 |
| 2022/0338245 | A1* | 10/2022 | Sha | H04W 74/0833 |
| 2023/0262672 | A1* | 8/2023 | Lin | H04L 5/0007 |
| | | | | 370/329 |

FOREIGN PATENT DOCUMENTS

| | | | | |
|---|---|---|---|---|
| WO | WO-2018085725 | A1 * | 5/2018 | |
| WO | WO-2020222203 | A1 * | 11/2020 | H04B 7/0695 |
| WO | WO-2021024016 | A1 * | 2/2021 | H04W 36/0083 |

* cited by examiner

BEAM AND NARROWBAND MANAGEMENT

CROSS-REFERENCE TO RELATED APPLICATION

This Patent application claims priority to U.S. Provisional Patent Application No. 63/198,490, filed on Oct. 22, 2020, entitled "BEAM AND NARROWBAND MANAGEMENT," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for beam and narrowband management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes selecting, while operating using a first beam corresponding to a cell, a second beam corresponding to the cell based at least in part on a set of beam information associated with the second beam, wherein a first narrowband is associated with the first beam and a second narrowband is associated with the second beam; and communicating with a wireless communication device that provides the cell using the second beam.

In some aspects, a method of wireless communication performed by a wireless communication device includes receiving an indication of a selection, by a UE operating using a first beam corresponding to a cell, of a second beam corresponding to the cell, wherein the selection is based at least in part on a set of beam information associated with the second beam, and wherein a first narrowband is associated with the first beam and a second narrowband is associated with the second beam; and communicating with the UE using the second beam.

In some aspects, a UE for wireless communication includes a memory and one or more processors coupled to the memory, the one or more processors configured to: select, while operating using a first beam corresponding to a cell, a second beam corresponding to the cell based at least in part on a set of beam information associated with the second beam, wherein a first narrowband is associated with the first beam and a second narrowband is associated with the second beam; and communicate with a wireless communication device that provides the cell using the second beam.

In some aspects, a wireless communication device for wireless communication includes a memory and one or more processors coupled to the memory, the one or more processors configured to: receive an indication of a selection of a second beam corresponding to the cell, wherein the selection is based at least in part on a set of beam information associated with the second beam, and wherein a first narrowband is associated with the first beam and a second narrowband is associated with the second beam; and communicate with a UE using the second beam.

In some aspects, a non-transitory computer-readable medium storing a set of instructions for wireless communication includes one or more instructions that, when executed by one or more processors of a UE, cause the UE to: select, while operating using a first beam corresponding to a cell, a second beam corresponding to the cell based at least in part on a set of beam information associated with the second beam, wherein a first narrowband is associated with the first beam and a second narrowband is associated with the second beam; and communicate with a wireless communication device that provides the cell using the second beam.

In some aspects, a non-transitory computer-readable medium storing a set of instructions for wireless communication includes one or more instructions that, when executed by one or more processors of a wireless communication device, cause the wireless communication device to: receive an indication of a selection of a second beam corresponding to the cell, wherein the selection is based at least in part on a set of beam information associated with the second beam, and wherein a first narrowband is associated with the first beam and a second narrowband is associated with the second beam; and communicate with the UE using the second beam.

In some aspects, an apparatus for wireless communication includes means for selecting, while operating using a first beam corresponding to a cell, a second beam corresponding to the cell based at least in part on a set of beam information associated with the second beam, wherein a first narrowband is associated with the first beam and a second narrowband is associated with the second beam; and means for communicating with a wireless communication device that provides the cell using the second beam.

In some aspects, an apparatus for wireless communication includes means for receiving an indication of a selection of a second beam corresponding to the cell, wherein the selection is based at least in part on a set of beam information associated with the second beam, and wherein a first narrowband is associated with the first beam and a second narrowband is associated with the second beam; and means for communicating with a user equipment using the second beam.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
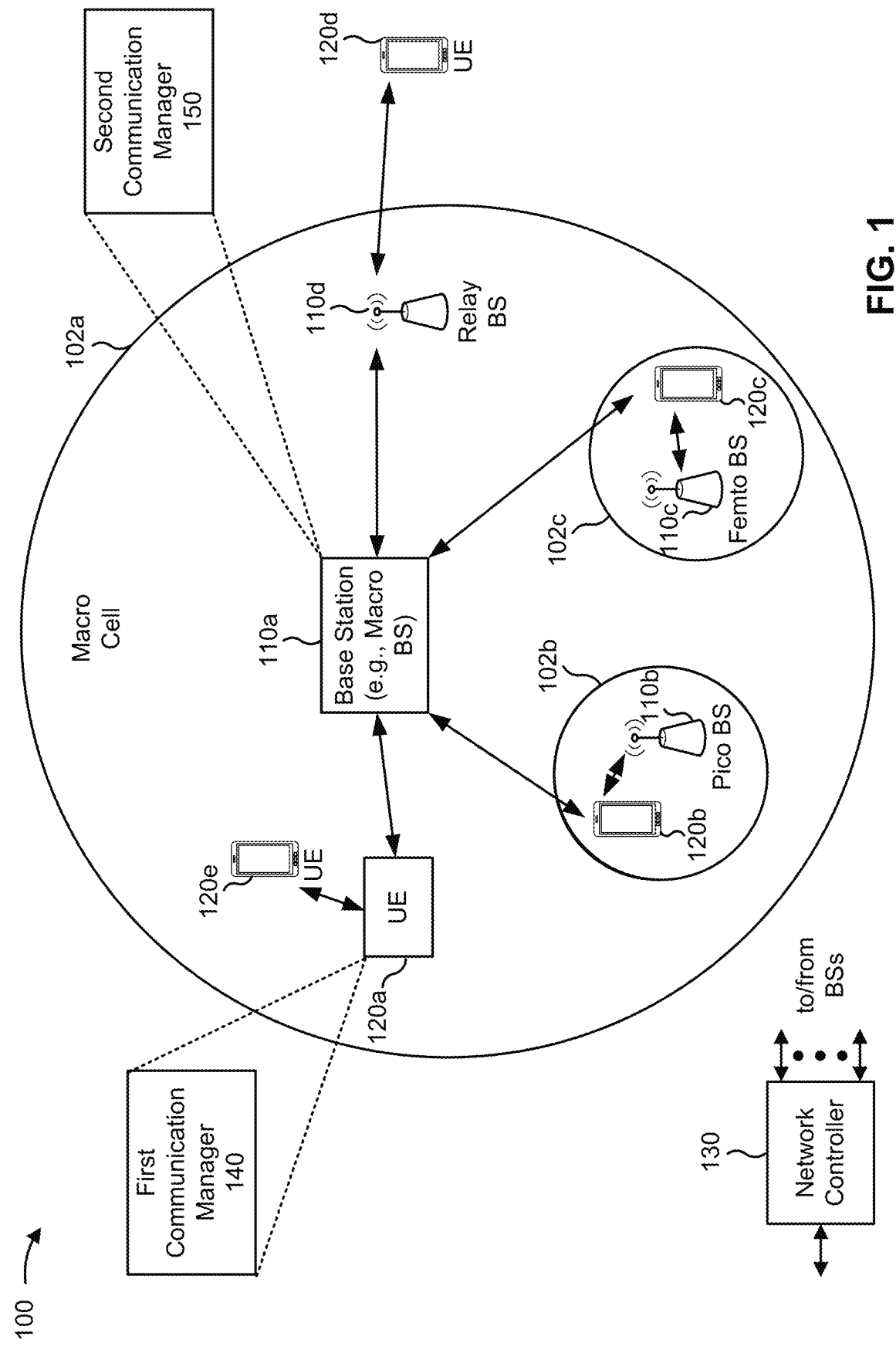
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), and/or a relay station (referred to herein, interchangeably, as a "non-terrestrial relay station"), among other examples. As used herein, "NTN" may refer to a network for which access is facilitated by a non-terrestrial UE, non-terrestrial BS, and/or a non-terrestrial relay station, among other examples.

The wireless network 100 may include any number of non-terrestrial wireless communication devices. A non-terrestrial wireless communication device may include a satellite, a manned aircraft system, and/or an unmanned aircraft system (UAS) platform, among other examples. A satellite may include a low-earth orbit (LEO) satellite, a medium-earth orbit (MEO) satellite, a geostationary earth orbit (GEO) satellite, and/or a high elliptical orbit (HEO) satellite, among other examples. A manned aircraft system may include an airplane, helicopter, and/or a dirigible, among other examples. A UAS platform may include a high-altitude platform station (HAPS), and may include a balloon, a dirigible, and/or an airplane, among other examples. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, and/or one or more components and/or devices included in a core network of wireless network 100, among other examples.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, and/or a central unit, among other examples. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming and/or precoding, among other examples) for communications between base stations and/or UEs (e.g., between two base stations, between two UEs, and/or between a base station and a UE). For example, wireless backhaul links between base stations may use millimeter waves to carry information and/or may be directed toward a target base station using beamforming and/or precoding, among other examples. Similarly, wireless access links between a UE and a base station may use millimeter waves and/or may be directed toward a target wireless node (e.g., a UE and/or a base station). In this way, inter-link interference may be reduced.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may select, while operating using a first beam corresponding to a cell, a second beam corresponding to the cell based at least in part on a set of beam information associated with the second beam, wherein a first narrowband is associated with the first beam and a second narrowband is associated with the second beam; and communicate with a wireless communication device that provides the cell using the second beam. Additionally, or alternatively, the first communication manager 140 may perform one or more other operations described herein.

In some aspects, the base station 110 may include a second communication manager 150. As described in more detail elsewhere herein, the second communication manager 150 may receive an indication of a selection, by a UE operating using a first beam corresponding to a cell, of a second beam corresponding to the cell, wherein the selection is based at least in part on a set of beam information associated with the second beam, and wherein a first narrowband is associated with the first beam and a second narrowband is associated with the second beam; and communicate with the UE using the second beam. Additionally, or alternatively, the second communication manager 150 may perform one or more other operations described herein.

As indicated above, FIG. 1 is provided merely as an example. Other examples may differ from what is described with regard to FIG. 1.

Figure 2:
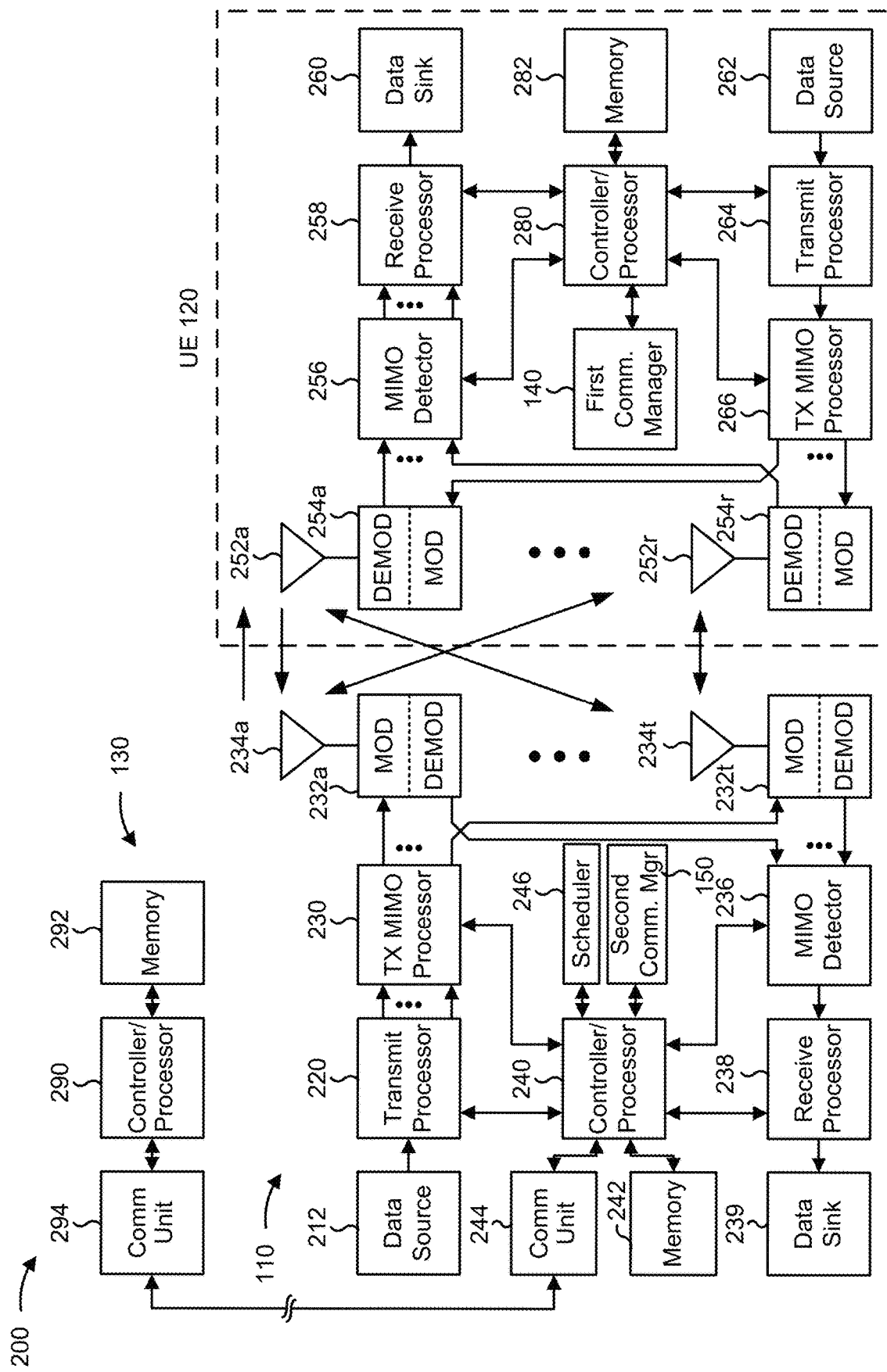
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-11.

Controller/processor 240 of base station 110, controller/processor 280 of UE 120, and/or any other component(s) of FIG. 2 may perform one or more techniques associated with beam and narrowband management, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for selecting, while operating using a first beam corresponding to a cell, a second beam corresponding to the cell based at least in part on a set of beam information associated with the second beam, wherein a first narrowband is associated with the first beam and a second narrowband is associated with the second beam and/or means for communicating with a wireless communication device that provides the cell using the second beam, among other examples. In some aspects, such means may include one or more components of UE 120 described in connection with FIG. 2, such as controller/ processor 280, transmit processor 264, TX MIMO processor 266, MOD 254, antenna 252, DEMOD 254, MIMO detector 256, and/or receive processor 258, among other examples.

In some aspects, a wireless communication device (e.g., base station 110) may include means for receiving an indication of a selection, by a UE operating using a first beam corresponding to a cell, of a second beam corresponding to the cell, wherein the selection is based at least in part on a set of beam information associated with the second beam, and wherein a first narrowband is associated with the first beam and a second narrowband is associated with the second beam and/or means for communicating with the UE using the second beam, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
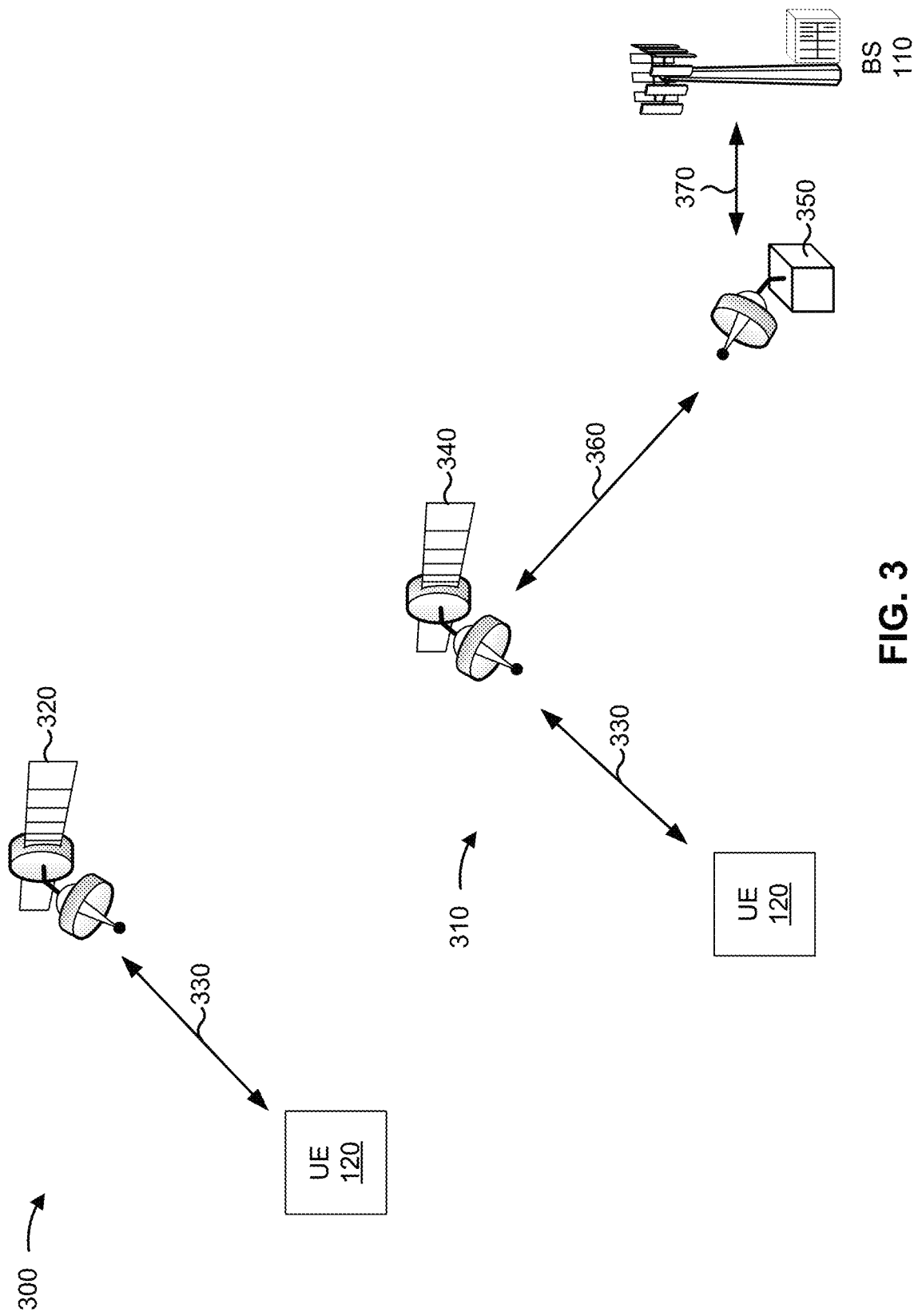
FIG. 3 is a diagram illustrating an example of a regenerative satellite deployment and an example of a transparent satellite deployment in a non-terrestrial network (NTN), in accordance with the present disclosure.

FIG. 3 is a diagram illustrating examples 300 and 310 of NTN deployments. The example 300 and/or the example 310 may be, be similar to, include, or be included in, a wireless network such as the wireless network 100 shown in, and described in connection with, FIG. 1.

Example 300 shows a conceptual depiction of a regenerative satellite deployment. In example 300, a UE 120 is served by a satellite 320 via a service link 330. For example, the satellite 320 may include a BS 110 (e.g., BS 110a), a gNB, and/or one or more functions (e.g., RF filtering, frequency conversion, amplification, demodulation, decoding, switching, routing, coding, and/or modulation, among other examples) of a BS 110, among other examples. The service link 330 may include an NR-Uu interface that is terminated at the satellite 320. In some aspects, the satellite 320 may be referred to as a non-terrestrial base station, a regenerative repeater, and/or an on-board processing repeater, among other examples. In some aspects, the satellite 320 may demodulate an uplink radio frequency signal, and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. The satellite 340 may be referred to as a transparent satellite, a bent-pipe satellite, and/or a non-terrestrial relay station, among other examples. The satellite 340 may relay a signal received from a terrestrial BS 110, via an NTN gateway 350. The satellite may repeat an NR-Uu interface via a feeder link 360. The NTN gateway 350 may communicatively connect the satellite 340 and the BS 110 using an RF link 370. For example, the satellite 340 may receive an uplink radio frequency transmission, and may transmit a downlink radio frequency transmission without demodulating the uplink radio frequency transmission. In some aspects, the satellite 340 may frequency convert the uplink radio frequency transmission received on the service link 330 to a frequency of the downlink radio frequency transmission on the feeder link 360, and may amplify and/or filter the uplink radio frequency transmission. In some aspects, the UEs 120 shown in example 300 and example 310 may be associated with a Global Navigation Satellite System (GNSS) capability, and/ or a Global Positioning System (GPS) capability, among other examples, though not all UEs have such capabilities. The satellite 340 may provide and/or facilitate a cell that covers the UE 120.

The service link 330 may include a link between the satellite 340 and the UE 120, and may include one or more of an uplink or a downlink. The feeder link 360 may include a link between the satellite 340 and the gateway 350, and may include one or more parts of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
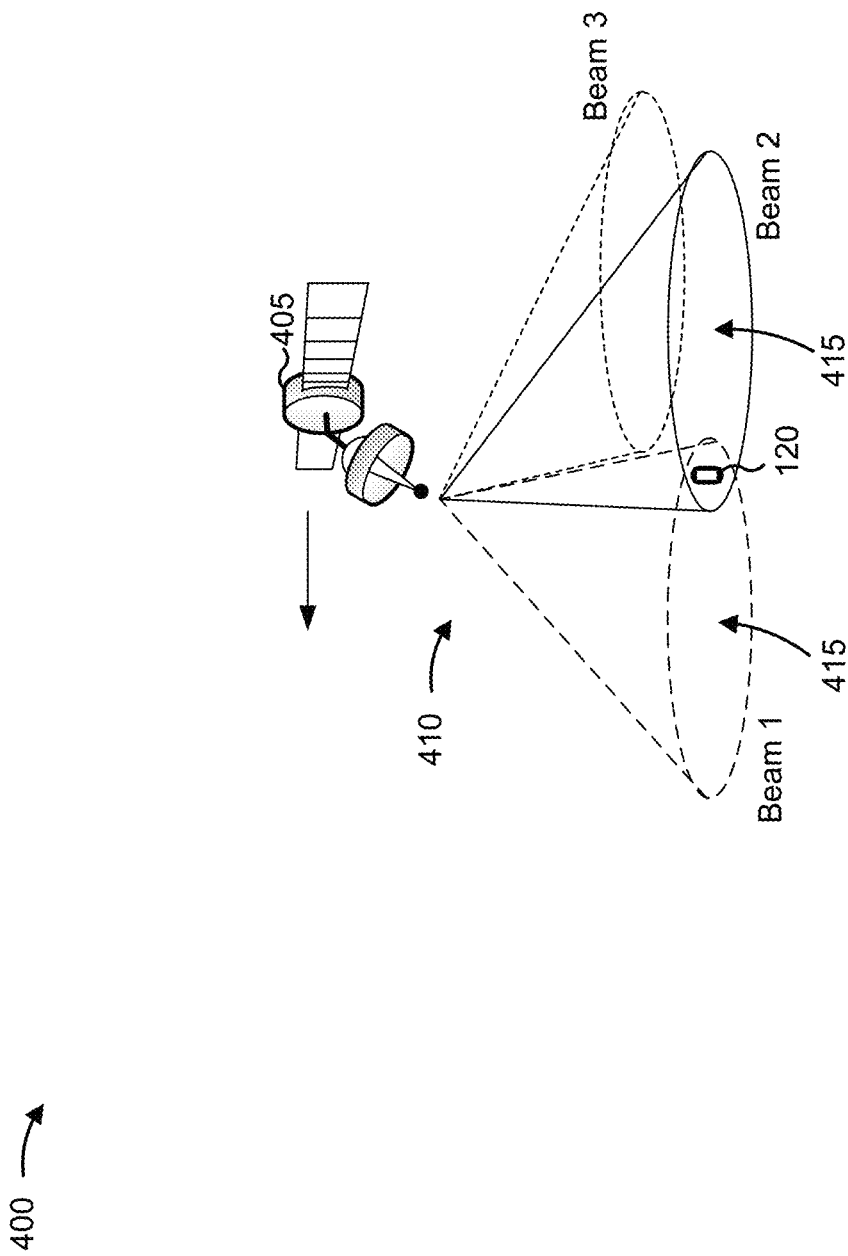
FIG. 4 is a diagram illustrating an example of measurement gap management in an NTN, in accordance with the present disclosure.

FIG. 4 is a diagram illustrating an example 400 of beam management in an NTN, in accordance with the present disclosure. As shown, a satellite 405 may serve a UE 120. The satellite 405 may include a base station 110 and/or a relay device, and may be, include, be included in, or be similar to, the satellite 320 shown in FIG. 3, and/or the satellite 340 shown in FIG. 3, among other examples.

As shown by reference number 410, the satellite 405 may use multiple antennas to form multiple beams (shown as "beam 1," "beam 2," and "beam 3,") that form a beam footprint 415 on the earth. One or more different frequency intervals may be associated with each beam to mitigate interference between beams, thereby facilitating simultaneous transmission and reception capabilities. In some cases, one or more different beams may be associated with a frequency interval. The frequency intervals may be, or include, narrowbands, such as narrowbands defined within the context of enhanced machine-type communication (eMTC).

As the satellite 405 moves, the beam footprint moves across the ground. A satellite may move as fast as, for example, 7 kilometers/second or faster. Due to the movement of the satellite 405, and thus the cell, multiple tracking areas within the coverage may be employed. The UE 120 may perceive a change of tracking area even though the UE 120 may be stationary. Because NTN cells may be very large compared to terrestrial network cells and may cover multiple tracking areas, cells may serve UEs from different tracking areas at tracking area borders. Therefore, additional physical random access channel formats have been developed to support satellite movement, but may result in unnecessary preamble ambiguity, paging loads, and cell-switching. As a result, communications between the satellite 405 and the UE 120 may be unreliable and may involve increased latency and decreased throughput.

According to various aspects of the techniques and apparatuses described herein, a wireless communication device (which may include a non-terrestrial base station, such as a satellite, a terrestrial base station, and/or a non-terrestrial relay device, among other examples) may provide multiple beams within a cell. The beams may be configured to operate as a single cell and each beam may operate using different frequencies and/or different narrowbands. In some aspects, a beam may support a number of narrowbands, each of which may be used for a different purpose. In some aspects, the wireless communication device may configure narrowbands for paging and/or physical random access channel (PRACH) procedures, and may provide information to a UE so that the UE may select appropriate beams and narrowbands within the cell. In this way, aspects may facilitate beam and narrowband management to reduce preamble ambiguity, paging loads, and cell switching. As a result, aspects may have positive impacts on the reliability of network communications, including decreased latency and increased throughput.

As indicated above, FIG. 4 is provided as an example. Other examples may differ from what is described with regard to FIG. 4.

Figure 5:
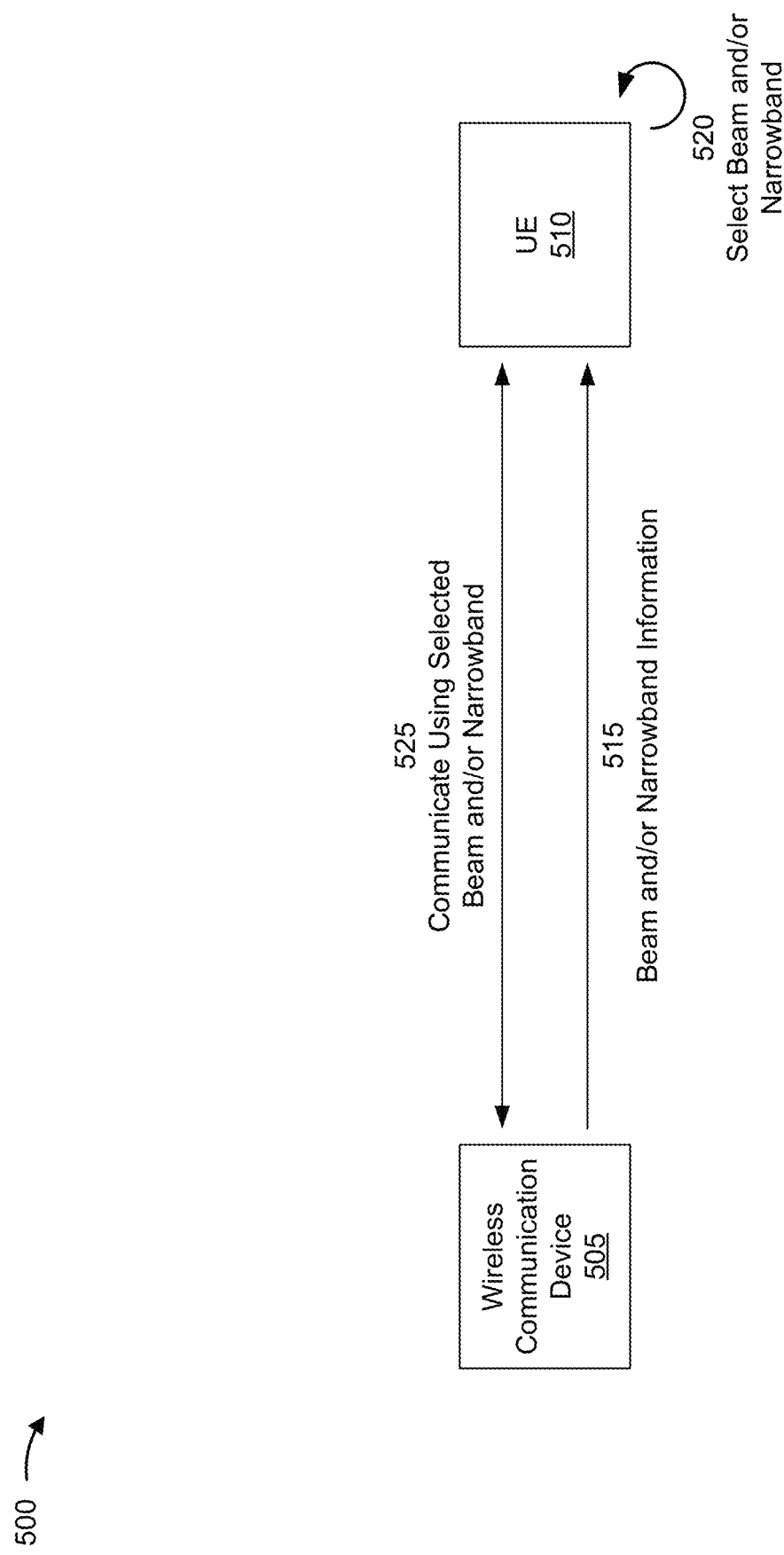
FIG. 5 is a diagram illustrating examples associated with beam and narrowband management, in accordance with the present disclosure.

FIG. 5 is a diagram illustrating an example 500 of beam and narrowband management, in accordance with the present disclosure. As shown in FIG. 5, a wireless communication device 505 and a UE 510 may communicate with one another. The wireless communication device 505 may include a non-terrestrial base station, and/or a non-terrestrial relay device, among other examples. The wireless communication device 505 may provide a cell for supporting wireless communications. The wireless communication device 505 may provide multiple beams within the cell, and the UE 510 may select beams to switch to as the UE 510 moves within the cell (or the cell moves relative to the UE 510).

As shown by reference number 515, the wireless communication device 505 may transmit, and the UE 510 may receive, beam and/or narrowband information. For example, the UE 510 may be operating using a first beam corresponding to the cell and the wireless communication device 505 may transmit, via the first beam, a set of beam information associated with a second beam. In some aspects, a first narrowband may be associated with the first beam and a second narrowband may be associated with the second beam. In some aspects, the UE 510 may store the set of beam information in a memory of the UE 510, and may access the set of beam information at a later time to facilitate selection of a beam and/or a narrowband. In some aspects, the UE 510 may operate using a first beam by receiving a first downlink communication using a first narrowband, and the UE 510 may communicate with the wireless communication device 505 using a second beam by transmitting an uplink communication using a second narrowband that does not match the first narrowband.

The set of beam information may include any number of different types of information. For example, in some aspects, the set of beam information may include an indication of a beam identifier (ID) corresponding to the second beam. The beam ID may be carried in at least one of: a PSS, an SSS, a master information block (MIB), or a system information block (SIB).

In some aspects, for example, the MIB may indicate an index corresponding to at least one of: a paging narrowband list of a plurality of paging narrowband lists, or a PRACH narrowband of a plurality of PRACH narrowbands. In some aspects, the wireless communication device 505 may transmit, and the UE 510 may receive, a first MIB associated with the first beam and a second MIB associated with the second beam. The first MIB may be carried using a first frequency, while the second MIB may be carried using a second frequency. In some aspects, the second frequency may match the first frequency. The second frequency may match the first frequency by being the same frequency, being a multiple of the first frequency, being within a threshold range of the first frequency, and/or according to a standard or specification. In this way, the UE 510 may be able to identify the first beam and the second beam as being part of the same cell and/or may be able to receive both MIBs without changing frequency.

In some aspects, the wireless communication device 505 may transmit, and the UE 510 may receive, a first SIB associated with the first beam and a second SIB associated with the second beam. The first SIB may be carried using a first narrowband and the second SIB may be carried using a second narrowband that matches the first narrowband. In some aspects, wireless communication device 505 may transmit, and the UE 510 may receive, a first paging message associated with the first beam and a second paging message associated with the second beam. The first paging message may be carried using a first narrowband and the second paging message may be carried using a second narrowband. The second narrowband may not match the first narrowband. In this way, the UE 510 may be able to identify, based on the narrowband, that the first and second beams are different beams.

In some aspects, the UE 510 may transmit, and the wireless communication device 505 may receive, an uplink random access channel (RACH) message associated with the first beam and the wireless communication device 505 may transmit, and the UE 510 may receive, a response RACH message associated with the second beam. The uplink RACH message may be carried using a first narrowband and the response RACH message may be carried using a second narrowband that does not match the first narrowband. In some aspects, the wireless communication device 505 may transmit, and the UE 510 may receive, a downlink RACH message associated with the first beam, and the UE 510 may transmit, and the wireless communication device 505 may receive, a response RACH message associated with the second beam. The downlink RACH message may be carried using the first narrowband and the response RACH message may be carried using the second narrowband that does not match the first narrowband.

In some aspects, the first beam may correspond to a first beam configuration and the second beam may correspond to a second beam configuration. A third beam may correspond to the first configuration. The first configuration may include at least one of: an indication of a first physical cell identifier (PCID), an indication to transmit a first beam ID in a first MIB, or an indication to transmit, using a first frequency, at least one of: a first PSS, a first SSS, or the first MIB. The second configuration comprises at least one of: an indication of the first PCID, an indication to transmit a second beam ID in a second MIB, or an indication to transmit, using a second frequency, at least one of: a second PSS, a second SSS, or the first MIB.

In some aspects, the first configuration may include at least one of: an indication of a first PCID, an indication to transmit a first paging message using a first narrowband, an indication to transmit a first paging narrowband list, an indication to transmit a first RACH message using the first narrowband, or an indication to transmit, using a first frequency, at least one of: a first PSS, a first SSS, or the first MIB. The second configuration may include at least one of: an indication of a second PCID, an indication to transmit a second paging message using a second narrowband, an indication to transmit a second paging narrowband list, an indication to transmit a second RACH message using the second narrowband, or an indication to transmit, using a first frequency, at least one of: a second PSS, a second SSS, or a second MIB.

In some aspects, the UE 510 may identify the second beam based at least in part on a frequency associated with the second beam and a PCID associated with the second beam. In some aspects, the wireless communication device 505 may transmit, and the UE 510 may receive, an MIB associated with the second beam and may identify the second beam based at least in part on the MIB. For example, the MIB may include a PCID and/or a beam ID that identifies the second beam.

As shown by reference number 520, the UE 510 may select a beam and/or a narrowband. For example, the UE 510 may select, while operating using a first beam corresponding to a cell, a second beam corresponding to the cell. The UE 510 may select the second beam and/or an associated narrowband based at least in part on the set of beam information associated with the second beam. In some aspects, the UE 510 may select the second narrowband based at least in part on determining that a first PCID associated with the first narrowband and a second PCID associated with the second narrowband match.

In some aspects, the first PCID associated with the first narrowband may not match the second PCID associated with the second narrowband. In those cases, the UE 510 may select the second beam based at least in part on receiving a first MIB associated with the first beam. The first MIB may indicate a first system information block 1 bandwidth reduced (SIB1-BR) scheduling. The UE 510 may receive a second MIB associated with the second beam. The second MIB may indicate a second SIB1-BR scheduling and the UE 510 may determine that the first SIB1-BR scheduling matches the second SIB1-BR scheduling. The UE 510 may select the second beam based at least in part on determining that the first SIB1-BR scheduling matches the second SIB1-BR scheduling.

As shown by reference number 525, the wireless communication device 505 and the UE 510 may communicate using the selected beam and/or narrowband. For example, in some aspects, operating using the first beam may include transmitting a first uplink communication using a first narrowband, and communicating with the wireless communication device using the second beam may include transmitting a second uplink communication using a second narrowband that does not match the first narrowband. In some aspects, operating using the first beam may include receiving a first downlink communication using a first narrowband, and communicating with the base station using the second beam may include receiving a second downlink communication using a second narrowband that does not match the first narrowband.

In some aspects, the UE 510 may refrain from receiving a SIB associated with the second beam. In some aspects, the UE 510 may receive a paging message based at least in part on a last connected cell and a last connected beam. The first beam may correspond to a first non-terrestrial device and the second beam may correspond to a second non-terrestrial device. In some aspects, for example, the UE 510 may receive an MIB associated with the second beam. The UE 510 may determine, based at least in part on the MIB, that the second beam is associated with an NTN. In some aspects, the MIB includes a physical channel hybrid automatic repeat request (HARQ) indicator channel (PHICH) configuration field. The PHICH configuration field may indicate a beam identifier associated with the second beam.

In some aspects, a first beam ID corresponding to the first beam may be associated with a first set of paging narrowbands, and a second beam ID corresponding to the second beam may be associated with a second set of paging narrowbands. The wireless communication device 505 may transmit, and the UE 510 may receive, an indication of the first set of paging narrowbands. The UE 510 may receive an indication of a paging narrowband offset associated with the second beam and may determine the second set of paging narrowbands based at least in part on the indication of the first set of paging narrowbands and the paging narrowband offset.

In some aspects, a first beam ID may correspond to the first beam and may be associated with a first set of PRACH narrowbands. A second beam ID may correspond to the second beam, and may be associated with a second set of PRACH narrowbands. In some aspects, the wireless communication device 505 may transmit, and the UE 510 may receive, a mapping of a plurality of beam identifiers to at least one of: a plurality of paging narrowbands, or a plurality of PRACH narrowbands. The mapping may be carried using at least one of: an SIB or a radio resource control (RRC) message.

In some aspects, communicating with the wireless communication device using the second beam may be based at least in part on a determination that a per-beam access barring mechanism condition is satisfied. In some cases, an access barring mechanism condition may be configured to bar access to a beam based at least in part on a condition such as a beam ID, a paging narrowband index, and/or a PRACH narrowband index, among other examples. For example, in some aspects, the wireless communication device 505 may transmit, and the UE 510 may receive, at least one SIB prior to initiating a PRACH procedure, where the at least one SIB indicates a per-beam barring bitmap. The at least one SIB may include, for example SIB 14 and/or SIB 25. The per-beam barring bitmap may be configured based on a beam ID, paging index, and/or a PRACH narrowband index. The bitmap may be based at least in part on at least one of: a beam ID, a paging narrowband index, or a PRACH narrowband index. In some aspects, the per-beam access barring mechanism condition may be based at least in part on a coverage enhancement level. For example, a first beam of a cell may allow access only in a coverage enhancement level 1, while a second beam may allow access only in a coverage enhancement level 2.

As indicated above, FIG. 5 is provided as an example. Other examples may differ from what is described with respect to FIG. 5.

Figure 6:
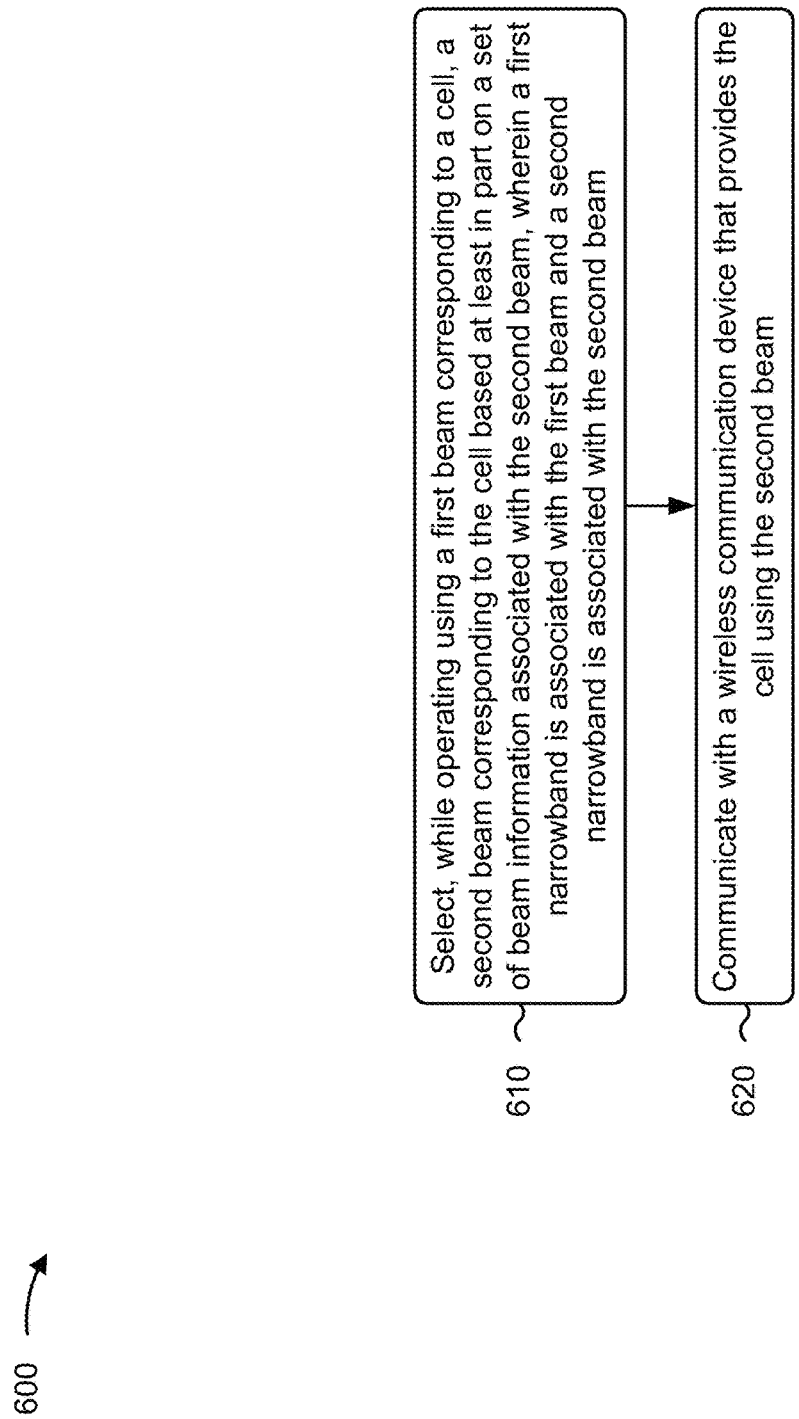
FIGS. 6 and 7 are diagrams illustrating example processes associated with beam and narrowband management, in accordance with the present disclosure.

FIG. 6 is a diagram illustrating an example process 600 performed, for example, by a UE, in accordance with the present disclosure. Example process 600 is an example where the UE (e.g., UE 510 shown in FIG. 5) performs operations associated with beam and narrowband management.

As shown in FIG. 6, in some aspects, process 600 may include selecting, while operating using a first beam corresponding to a cell, a second beam corresponding to the cell based at least in part on a set of beam information associated with the second beam, wherein a first narrowband is associated with the first beam and a second narrowband is associated with the second beam (block 610). For example, the UE (e.g., using communication manager 804, depicted in FIG. 8) may select, while operating using a first beam corresponding to a cell, a second beam corresponding to the cell based at least in part on a set of beam information associated with the second beam, wherein a first narrowband is associated with the first beam and a second narrowband is associated with the second beam, as described above.

As further shown in FIG. 6, in some aspects, process 600 may include communicating with a wireless communication device that provides the cell using the second beam (block 620). For example, the UE (e.g., using reception component 802 and/or transmission component 806 depicted in FIG. 8) may communicate with a wireless communication device that provides the cell using the second beam, as described above.

Process 600 may include additional aspects, such as any single aspect or any combination of aspects described below and/or in connection with one or more other processes described elsewhere herein.

In a first aspect, the set of beam information is stored in a memory of the UE.

In a second aspect, alone or in combination with the first aspect, process 600 includes accessing the set of beam information stored in the memory, and selecting the second narrowband based at least in part on the set of beam information.

In a third aspect, alone or in combination with the second aspect, selecting the second narrowband comprises selecting the second narrowband based at least in part on determining that a first PCID associated with the first narrowband and a second PCID associated with the second narrowband match.

In a fourth aspect, alone or in combination with one or more of the first through third aspects, process 600 includes receiving an indication of a beam ID corresponding to the second beam.

In a fifth aspect, alone or in combination with the fourth aspect, the beam ID is carried in at least one of a PSS, an SSS, an MIB, or an SIB.

In a sixth aspect, alone or in combination with one or more of the first through fifth aspects, a first PCID associated with the first narrowband does not match a second PCID associated with the second narrowband, and selecting the second beam comprises receiving a first MIB associated with the first beam, wherein the first MIB indicates a first SIB1-BR scheduling; receiving a second MIB associated with the second beam, wherein the second MIB indicates a second SIB1-BR scheduling; and determining that the first SIB1-BR scheduling matches the second SIB1-BR scheduling, wherein selecting the second beam comprises selecting the second beam based at least in part on determining that the first SIB1-BR scheduling matches the second SIB1-BR scheduling.

In a seventh aspect, alone or in combination with one or more of the first through sixth aspects, process 600 includes receiving an MIB associated with the second beam, wherein the MIB indicates an index corresponding to at least one of a paging narrowband list of a plurality of paging narrowband lists, or a PRACH narrowband of a plurality of PRACH narrowbands.

In an eighth aspect, alone or in combination with one or more of the first through seventh aspects, process 600 includes receiving a first MIB associated with the first beam, wherein the first MIB is carried using a first frequency, and receiving a second MIB associated with the second beam, wherein the second MIB is carried using a second frequency that matches the first frequency.

In a ninth aspect, alone or in combination with one or more of the first through eighth aspects, process 600 includes receiving a first SIB associated with the first beam, wherein the first SIB is carried using a first narrowband, and receiving a second SIB associated with the second beam, wherein the second SIB is carried using a second narrowband that matches the first narrowband.

In a tenth aspect, alone or in combination with one or more of the first through ninth aspects, process 600 includes receiving a first paging message associated with the first beam, wherein the first paging message is carried using a first narrowband, and receiving a second paging message associated with the second beam, wherein the second paging message is carried using a second narrowband that does not match the first narrowband.

In an eleventh aspect, alone or in combination with one or more of the first through tenth aspects, process 600 includes receiving a first RACH message associated with the first beam, wherein the first RACH message is carried using a first narrowband, and receiving a second RACH message associated with the second beam, wherein the second RACH message is carried using a second narrowband that does not match the first narrowband.

In a twelfth aspect, alone or in combination with one or more of the first through eleventh aspects, operating using the first beam comprises transmitting a first uplink communication using a first narrowband, and communicating with the wireless communication device using the second beam comprises transmitting a second uplink communication using a second narrowband that does not match the first narrowband.

In a thirteenth aspect, alone or in combination with one or more of the first through twelfth aspects, operating using the first beam comprises receiving a first downlink communication using a first narrowband, and communicating with the wireless communication device using the second beam comprises receiving a second downlink communication using a second narrowband that does not match the first narrowband.

In a fourteenth aspect, alone or in combination with one or more of the first through thirteenth aspects, the first beam corresponds to a first beam configuration and the second beam corresponds to a second beam configuration.

In a fifteenth aspect, alone or in combination with the fourteenth aspect, a third beam comprises the first beam configuration.

In a sixteenth aspect, alone or in combination with the fourteenth aspect or the fifteenth aspect, the first configuration comprises at least one of an indication of a first PCID, an indication to transmit a first beam ID in a first MIB, or an indication to transmit, using a first frequency, at least one of a first PSS, a first SSS, or the first MIB.

In a seventeenth aspect, alone or in combination with the sixteenth aspect, the second configuration comprises at least one of an indication of the first PCID, an indication to transmit a second beam ID in a second MIB, or an indication to transmit, using a second frequency, at least one of a second PSS, a second SSS, or the first MIB.

In an eighteenth aspect, alone or in combination with the fourteenth aspect, the first configuration comprises at least one of an indication of a first PCID, an indication to transmit a first paging message using a first narrowband, an indication to transmit a first paging narrowband list, an indication to transmit a first RACH message using the first narrowband, or an indication to transmit, using a first frequency, at least one of a first PSS, a first SSS, or the first MIB.

In a nineteenth aspect, alone or in combination with the eighteenth aspect, the second configuration comprises at least one of an indication of a second PCID, an indication to transmit a second paging message using a second narrowband, an indication to transmit a second paging narrowband list, an indication to transmit a second RACH message using the second narrowband, or an indication to transmit, using a first frequency, at least one of a second PSS, a second SSS, or a second MIB.

In a twentieth aspect, alone or in combination with one or more of the first through nineteenth aspects, process 600 includes identifying the second beam based at least in part on a frequency associated with the second beam and a PCID associated with the second beam.

In a twenty-first aspect, alone or in combination with one or more of the first through twentieth aspects, process 600 includes receiving an MIB associated with the second beam, and identifying the second beam based at least in part on the MIB.

In a twenty-second aspect, alone or in combination with the twenty-first aspect, process 600 includes refraining from receiving an SIB associated with the second beam.

In a twenty-third aspect, alone or in combination with one or more of the first through twenty-second aspects, process 600 includes receiving a paging message based at least in part on a last connected cell and a last connected beam.

In a twenty-fourth aspect, alone or in combination with one or more of the first through twenty-third aspects, the first beam corresponds to a first non-terrestrial device and the second beam corresponds to a second non-terrestrial device.

In a twenty-fifth aspect, alone or in combination with one or more of the first through twenty-fourth aspects, process 600 includes receiving an MIB associated with the second beam, and determining, based at least in part on the MIB, that the second beam is associated with a non-terrestrial network.

In a twenty-sixth aspect, alone or in combination with one or more of the first through twenty-fifth aspects, a master information block associated with the second beam includes a PHICH configuration field, wherein the PHICH configuration field indicates a beam identifier associated with the second beam.

In a twenty-seventh aspect, alone or in combination with one or more of the first through twenty-sixth aspects, a first beam ID corresponding to the first beam is associated with a first set of paging narrowbands, and a second beam ID corresponding to the second beam is associated with a second set of paging narrowbands.

In a twenty-eighth aspect, alone or in combination with one or more of the first through twenty-seventh aspects, process 600 includes receiving an indication of the first set of paging narrowbands, receiving an indication of a paging narrowband offset associated with the second beam, and determining the second set of paging narrowbands based at least in part on the indication of the first set of paging narrowbands and the paging narrowband offset.

In a twenty-ninth aspect, alone or in combination with one or more of the first through twenty-eighth aspects, a first beam ID corresponding to the first beam is associated with a first set of PRACH narrowbands, and a second beam ID corresponding to the second beam is associated with a second set of PRACH narrowbands.

In a thirtieth aspect, alone or in combination with one or more of the first through twenty-ninth aspects, process 600 includes receiving a mapping of a plurality of beam identifiers to at least one of a plurality of paging narrowbands, or a plurality of physical random access channel narrowbands.

In a thirty-first aspect, alone or in combination with one or more of the first through thirtieth aspects, the mapping is carried using at least one of a system information block, or a radio resource control message.

In a thirty-second aspect, alone or in combination with one or more of the first through thirty-first aspects, communicating with the wireless communication device using the second beam is based at least in part on a determination that a per-beam access barring mechanism condition is satisfied.

In a thirty-third aspect, alone or in combination with one or more of the first through thirty-second aspects, process 600 includes receiving at least one SIB prior to initiating a PRACH procedure, wherein the at least one SIB indicates a per-beam barring bitmap.

In a thirty-fourth aspect, alone or in combination with one or more of the first through thirty-third aspects, the bitmap is based at least in part on at least one of a beam identifier, a paging narrowband index, or a PRACH narrowband index.

In a thirty-fifth aspect, alone or in combination with one or more of the first through thirty-fourth aspects, the per-beam access barring mechanism condition is based at least in part on a coverage enhancement level.

In a thirty-sixth aspect, alone or in combination with one or more of the first through thirty-fifth aspects, the cell is associated with an NTN.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
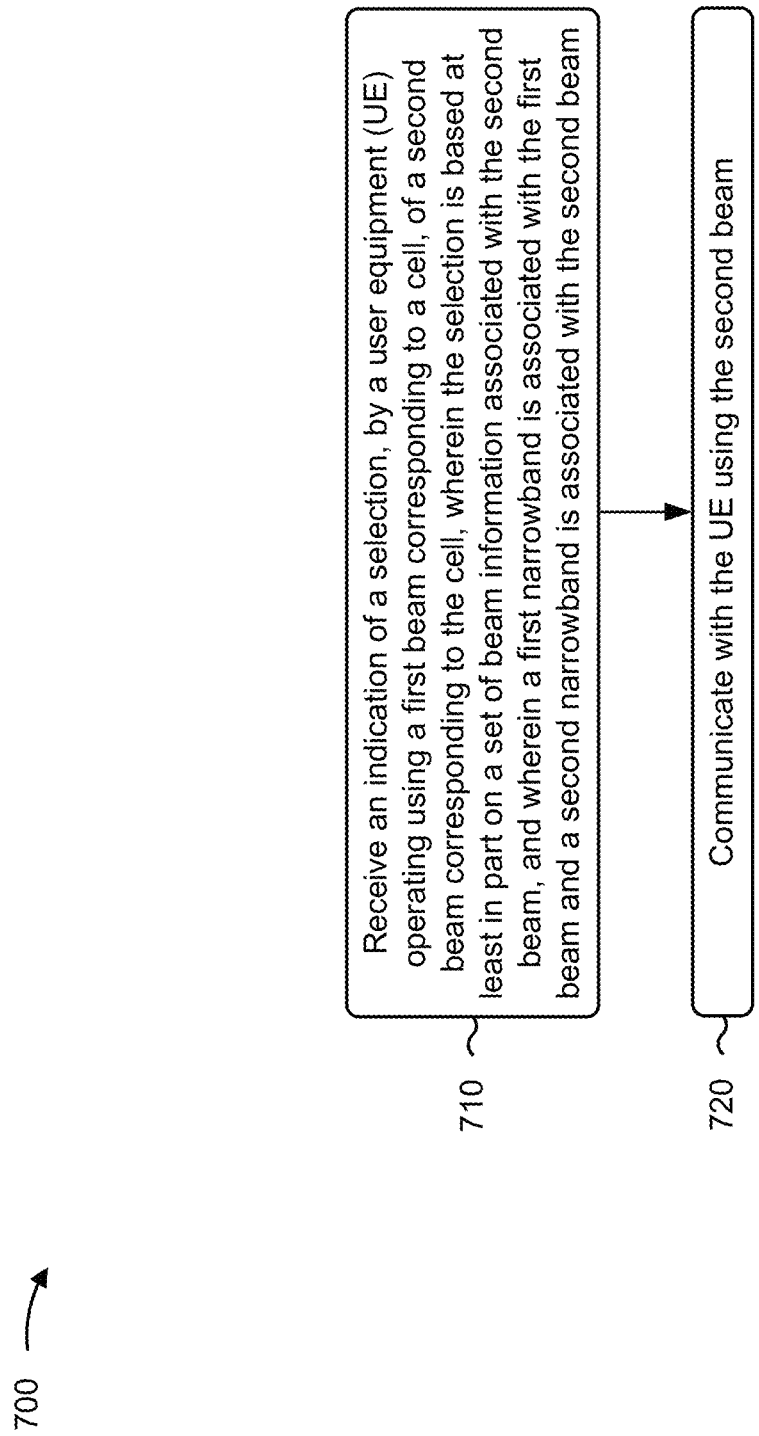

FIG. 7 is a diagram illustrating an example process 700 performed, for example, by a wireless communication device, in accordance with the present disclosure. Example process 700 is an example where the wireless communication device (e.g., wireless communication device 505 shown in FIG. 5) performs operations associated with beam and narrowband management.

As shown in FIG. 7, in some aspects, process 700 may include receiving an indication of a selection of a second beam corresponding to the cell, wherein the selection is based at least in part on a set of beam information associated with the second beam, and wherein a first narrowband is associated with the first beam and a second narrowband is associated with the second beam (block 710). For example, the wireless communication device (e.g., using reception component 1002, depicted in FIG. 10) may receive an indication of a selection of a second beam corresponding to the cell, wherein the selection is based at least in part on a set of beam information associated with the second beam, and wherein a first narrowband is associated with the first beam and a second narrowband is associated with the second beam, as described above.

As further shown in FIG. 7, in some aspects, process 700 may include communicating with a UE using the second beam (block 720). For example, the wireless communication device (e.g., using reception component 1002 and/or transmission component 1006, depicted in FIG. 10) may communicate with the UE using the second beam, as described above.

Process 700 may include additional aspects, such as any single aspect or any combination of aspects described below and/or in connection with one or more other processes described elsewhere herein.

In a first aspect, the set of beam information is stored in a memory of the UE.

In a second aspect, alone or in combination with the first aspect, the selection comprises a selection of the second narrowband based at least in part on determining that a first PCID associated with the first narrowband and a second PCID associated with the second narrowband match.

In a third aspect, alone or in combination with one or more of the first and second aspects, process 700 includes transmitting an indication of a beam ID corresponding to the second beam.

In a fourth aspect, alone or in combination with the third aspect, the beam ID is carried in at least one of a primary synchronization signal, a secondary synchronization signal, a master information block, or a system information block.

In a fifth aspect, alone or in combination with one or more of the first through fourth aspects, a first PCID associated with the first narrowband does not match a second PCID associated with the second narrowband, and process 700 further comprises transmitting a first MIB associated with the first beam, wherein the first MIB indicates a first SIB1-BR scheduling, and transmitting a second MIB associated with the second beam, wherein the second MIB indicates a second SIB1-BR scheduling, wherein the selection of the second beam is based at least in part on a determination that the first SIB1-BR scheduling matches the second SIB1-BR scheduling.

In a sixth aspect, alone or in combination with one or more of the first through fifth aspects, process 700 includes transmitting an MIB associated with the second beam, wherein the MIB indicates an index corresponding to at least one of a paging narrowband list of a plurality of paging narrowband lists, or a PRACH narrowband of a plurality of PRACH narrowbands.

In a seventh aspect, alone or in combination with one or more of the first through sixth aspects, process 700 includes transmitting a first MIB associated with the first beam, wherein the first MIB is carried using a first frequency, and transmitting a second MIB associated with the second beam, wherein the second MIB is carried using a second frequency that matches the first frequency.

In an eighth aspect, alone or in combination with one or more of the first through seventh aspects, process 700 includes transmitting a first SIB associated with the first beam, wherein the first SIB is carried using a first narrowband, and transmitting a second SIB associated with the second beam, wherein the second SIB is carried using a second narrowband that matches the first narrowband.

In a ninth aspect, alone or in combination with one or more of the first through eighth aspects, process 700 includes transmitting a first paging message associated with the first beam, wherein the first paging message is carried using a first narrowband, and transmitting a second paging message associated with the second beam, wherein the second paging message is carried using a second narrowband that does not match the first narrowband.

In a tenth aspect, alone or in combination with one or more of the first through ninth aspects, process 700 includes transmitting a first RACH message associated with the first beam, wherein the first RACH message is carried using a first narrowband, and transmitting a second RACH message associated with the second beam, wherein the second RACH message is carried using a second narrowband that does not match the first narrowband.

In an eleventh aspect, alone or in combination with one or more of the first through tenth aspects, operating using the first beam comprises receiving a first uplink communication using a first narrowband, and communicating with the UE using the second beam comprises receiving a second uplink communication using a second narrowband that does not match the first narrowband.

In a twelfth aspect, alone or in combination with one or more of the first through eleventh aspects, operating using the first beam comprises transmitting a first downlink communication using a first narrowband, and communicating with the UE using the second beam comprises transmitting a second downlink communication using a second narrowband that does not match the first narrowband.

In a thirteenth aspect, alone or in combination with one or more of the first through twelfth aspects, the first beam corresponds to a first beam configuration and the second beam corresponds to a second beam configuration.

In a fourteenth aspect, alone or in combination with the thirteenth aspect, a third beam comprises the first beam configuration.

In a fifteenth aspect, alone or in combination with one or more of the thirteenth or fourteenth aspects, the first configuration comprises at least one of an indication of a first PCID, an indication to transmit a first beam ID in a first MIB, or an indication to transmit, using a first frequency, at least one of a first PSS, a first SSS, or the first MIB.

In a sixteenth aspect, alone or in combination with the fifteenth aspect, the second configuration comprises at least one of an indication of the first PCID, an indication to transmit a second beam ID in a second MIB, or an indication to transmit, using a second frequency, at least one of a second PSS, a second SSS, or the first MIB.

In a seventeenth aspect, alone or in combination with the fifteenth aspect, the first configuration comprises at least one of an indication of a first PCID, an indication to transmit a first paging message using a first narrowband, an indication to transmit a first paging narrowband list, an indication to transmit a first RACH message using the first narrowband, or an indication to transmit, using a first frequency, at least one of a first PSS, a first SSS, or the first MIB.

In an eighteenth aspect, alone or in combination with the seventeenth aspect, the second configuration comprises at least one of an indication of a second PCID, an indication to transmit a second paging message using a second narrowband, an indication to transmit a second paging narrowband list, an indication to transmit a second RACH message using the second narrowband, or an indication to transmit, using a first frequency, at least one of a PSS, an SSS, or a second MIB.

In a nineteenth aspect, alone or in combination with one or more of the first through eighteenth aspects, process 700 includes transmitting an MIB associated with the second beam, wherein an identification of the second beam is based at least in part on the MIB.

In a twentieth aspect, alone or in combination with one or more of the first through nineteenth aspects, process 700 includes transmitting a paging message based at least in part on a last connected cell and a last connected beam.

In a twenty-first aspect, alone or in combination with one or more of the first through twentieth aspects, the first beam corresponds to a first non-terrestrial device and the second beam corresponds to a second non-terrestrial device.

In a twenty-second aspect, alone or in combination with one or more of the first through twenty-first aspects, process 700 includes transmitting an MIB associated with the second beam, wherein a determination that the second beam is associated with a non-terrestrial network is based at least in part on the MIB.

In a twenty-third aspect, alone or in combination with the twenty-second aspect, a master information block associated with the second beam includes a PHICH configuration field, wherein the PHICH configuration field indicates a beam identifier associated with the second beam.

In a twenty-fourth aspect, alone or in combination with one or more of the first through twenty-third aspects, a first beam ID corresponding to the first beam is associated with a first set of paging narrowbands, and a second beam ID corresponding to the second beam is associated with a second set of paging narrowbands.

In a twenty-fifth aspect, alone or in combination with the twenty-fourth aspect, process 700 includes receiving an indication of the first set of paging narrowbands, and transmitting an indication of a paging narrowband offset associated with the second beam, wherein a determination of a second set of paging narrowbands is based at least in part on the indication of the first set of paging narrowbands and the paging narrowband offset.

In a twenty-sixth aspect, alone or in combination with one or more of the first through twenty-fifth aspects, a first beam ID corresponding to the first beam is associated with a first set of PRACH narrowbands, and a second beam ID corresponding to the second beam is associated with a second set of PRACH narrowbands.

In a twenty-seventh aspect, alone or in combination with one or more of the first through twenty-sixth aspects, process 700 includes transmitting a mapping of a plurality of beam identifiers to at least one of a plurality of paging narrowbands, or a plurality of physical random access channel narrowbands.

In a twenty-eighth aspect, alone or in combination with the twenty-seventh aspect, the mapping is carried using at least one of a SIB or an RRC message.

In a twenty-ninth aspect, alone or in combination with one or more of the first through twenty-eighth aspects, communicating with the UE using the second beam is based at least in part on a determination that a per-beam access barring mechanism condition is satisfied.

In a thirtieth aspect, alone or in combination with the twenty-ninth aspect, process 700 includes transmitting at least one SIB prior to initialization of a PRACH procedure, wherein the at least one SIB indicates a per-beam barring bitmap.

In a thirty-first aspect, alone or in combination with the thirtieth aspect, the bitmap is based at least in part on at least one of a beam identifier, a paging narrowband index, or a PRACH narrowband index.

In a thirty-second aspect, alone or in combination with the thirtieth or thirty-first aspects, the per-beam access barring mechanism condition is based at least in part on a coverage enhancement level.

In a thirty-third aspect, alone or in combination with one or more of the first through thirty-second aspects, the cell is associated with a non-terrestrial network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
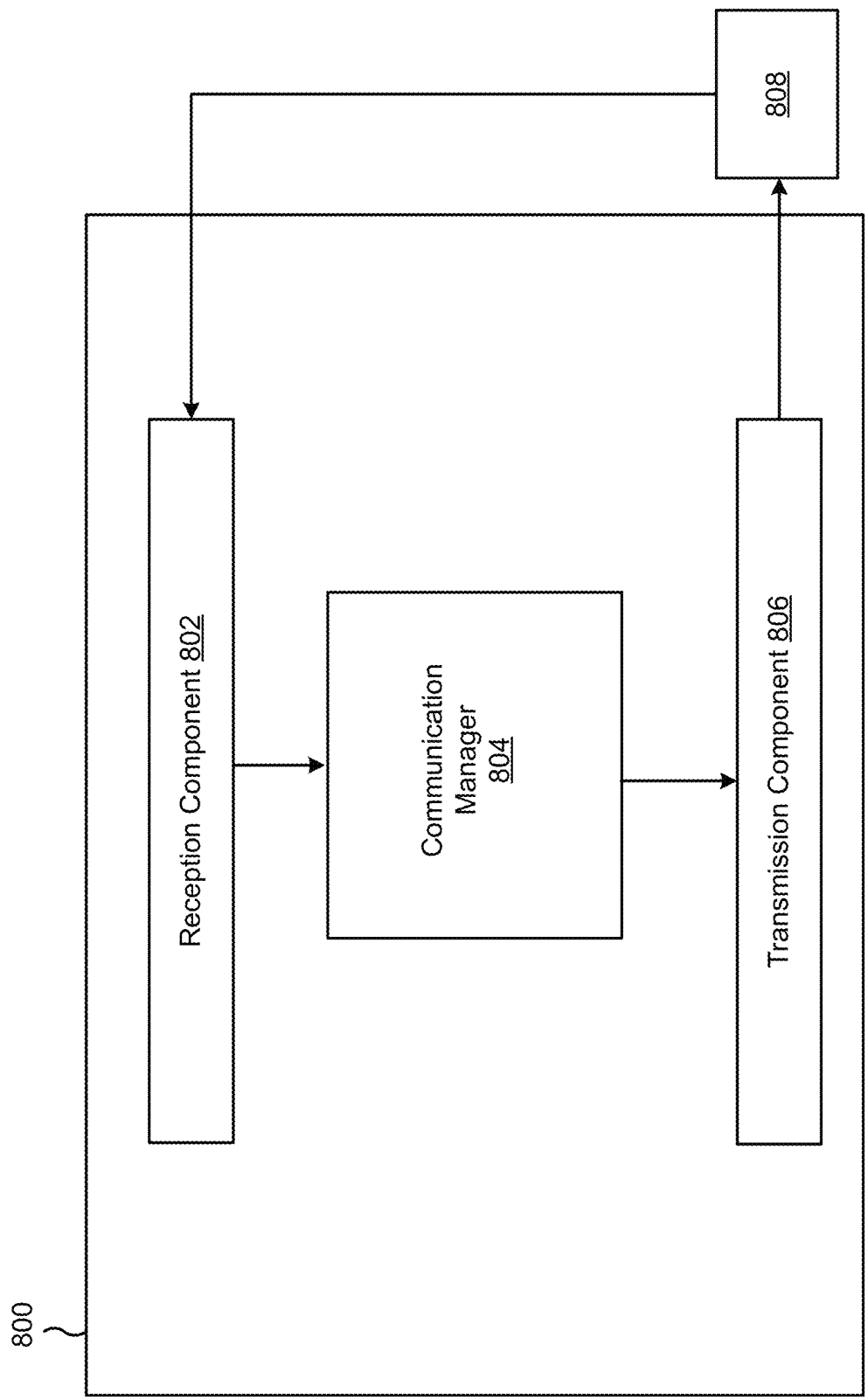
FIGS. 8-11 are block diagrams of example apparatuses for wireless communication, in accordance with the present disclosure.

FIG. 8 is a block diagram of an example apparatus 800 for wireless communication in accordance with the present disclosure. The apparatus 800 may be, be similar to, include, or be included in a UE (e.g., UE 510 shown in FIG. 5). In some aspects, the apparatus 800 includes a reception component 802, a communication manager 804, and a transmission component 806, which may be in communication with one another (for example, via one or more buses). As shown, the apparatus 800 may communicate with another apparatus 808 (such as a client, a server, a UE, a base station, or another wireless communication device) using the reception component 802 and the transmission component 806.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 may include one or more components of the first UE described above in connection with FIG. 2.

The reception component 802 may provide means for receiving communications, such as reference signals, control information, data communications, or a combination thereof, from the apparatus 808. The reception component 802 may provide received communications to one or more other components of the apparatus 800, such as the communication manager 804. In some aspects, the reception component 802 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the first UE described above in connection with FIG. 2.

The transmission component 806 may provide means for transmitting communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may provide means for performing signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the first UE described above in connection with FIG. 2. In some aspects, the transmission component 806 may be co-located with the reception component 802 in a transceiver.

In some aspects, the communication manager 804 may provide means for selecting, while operating using a first beam corresponding to a cell, a second beam corresponding to the cell based at least in part on a set of beam information associated with the second beam, wherein a first narrowband is associated with the first beam and a second narrowband is associated with the second beam; and communicating with a wireless communication device that provides the cell using the second beam. In some aspects, the communication manager 804 may include a controller/processor, a memory, or a combination thereof, of the first UE described above in connection with FIG. 2. In some aspects, the communication manager 804 may include the reception component 802 and/or the transmission component 806, among other examples. In some aspects, the means provided by the communication manager 804 may include, or be included within, means provided by the reception component 802 and/or the transmission component 806, among other examples.

In some aspects, the communication manager 804 and/or one or more components of the communication manager 804 may include or may be implemented within hardware (e.g., the circuitry described in connection with FIG. 2). In some aspects, the communication manager 804 and/or one or more components thereof may include or may be implemented within a controller/processor, a memory, or a combination thereof, of the UE 120 described above in connection with FIG. 2.

In some aspects, the communication manager 804 and/or one or more components of the communication manager 804 may be implemented in code (e.g., as software or firmware stored in a memory). For example, the communication manager 804 and/or a component (or a portion of a component) of the communication manager 804 may be implemented as instructions or code stored in a non-transitory computer-readable medium and executable by a controller or a processor to perform the functions or operations of the communication manager 804 and/or the component. If implemented in code, the functions of the communication manager 804 and/or a component may be executed by a controller/processor, a memory, a scheduler, a communication unit, or a combination thereof, of the UE 120 described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
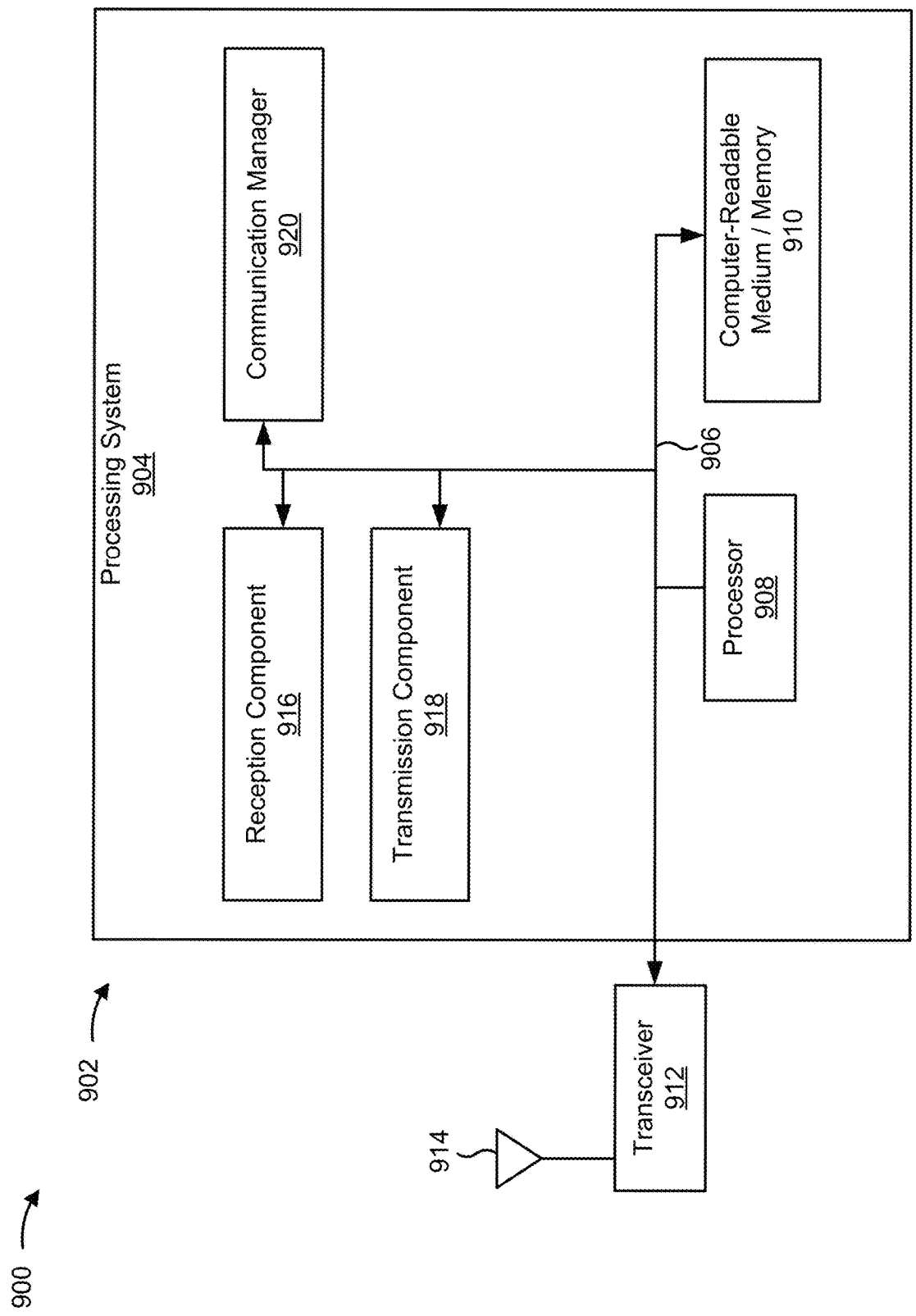

FIG. 9 is a diagram illustrating an example 900 of a hardware implementation for an apparatus 902 employing a processing system 904. The apparatus 902 may be, be similar to, include, or be included in the apparatus 800 shown in FIG. 8.

The processing system 904 may be implemented with a bus architecture, represented generally by the bus 906. The bus 906 may include any number of interconnecting buses and bridges depending on the specific application of the processing system 904 and the overall design constraints. The bus 906 links together various circuits including one or more processors and/or hardware components, represented by a processor 908, the illustrated components, and the computer-readable medium/memory 910. The bus 906 may also link various other circuits, such as timing sources, peripherals, voltage regulators, and/or power management circuits, among other examples.

The processing system 904 may be coupled to a transceiver 912. The transceiver 912 is coupled to one or more antennas 914. The transceiver 912 provides a means for communicating with various other apparatuses over a transmission medium. The transceiver 912 receives a signal from the one or more antennas 914, extracts information from the received signal, and provides the extracted information to the processing system 904, specifically a reception component 916. In addition, the transceiver 912 receives information from the processing system 904, specifically a transmission component 918, and generates a signal to be applied to the one or more antennas 914 based at least in part on the received information. The processing system may include a communication manager 920 configured to manage one or more operations associated with communications described herein.

The processor 908 is coupled to the computer-readable medium/memory 910. The processor 908 is responsible for general processing, including the execution of software stored on the computer-readable medium/memory 910. The software, when executed by the processor 908, causes the processing system 904 to perform the various functions described herein in connection with a client. The computer-readable medium/memory 910 may also be used for storing data that is manipulated by the processor 908 when executing software. The processing system 904 may include any number of additional components not illustrated in FIG. 9. The components illustrated and/or not illustrated may be software modules running in the processor 908, resident/stored in the computer-readable medium/memory 910, one or more hardware modules coupled to the processor 908, or some combination thereof.

In some aspects, the processing system 904 may be a component of the UE 120 and may include the memory 282 and/or at least one of the TX MIMO processor 266, the RX processor 258, and/or the controller/processor 280. In some aspects, the apparatus 902 for wireless communication provides means for selecting, while operating using a first beam corresponding to a cell, a second beam corresponding to the cell based at least in part on a set of beam information associated with the second beam, wherein a first narrowband is associated with the first beam and a second narrowband is associated with the second beam; and communicating with a wireless communication device that provides the cell using the second beam. The aforementioned means may be one or more of the aforementioned components of the processing system 904 of the apparatus 902 configured to perform the functions recited by the aforementioned means. As described elsewhere herein, the processing system 904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
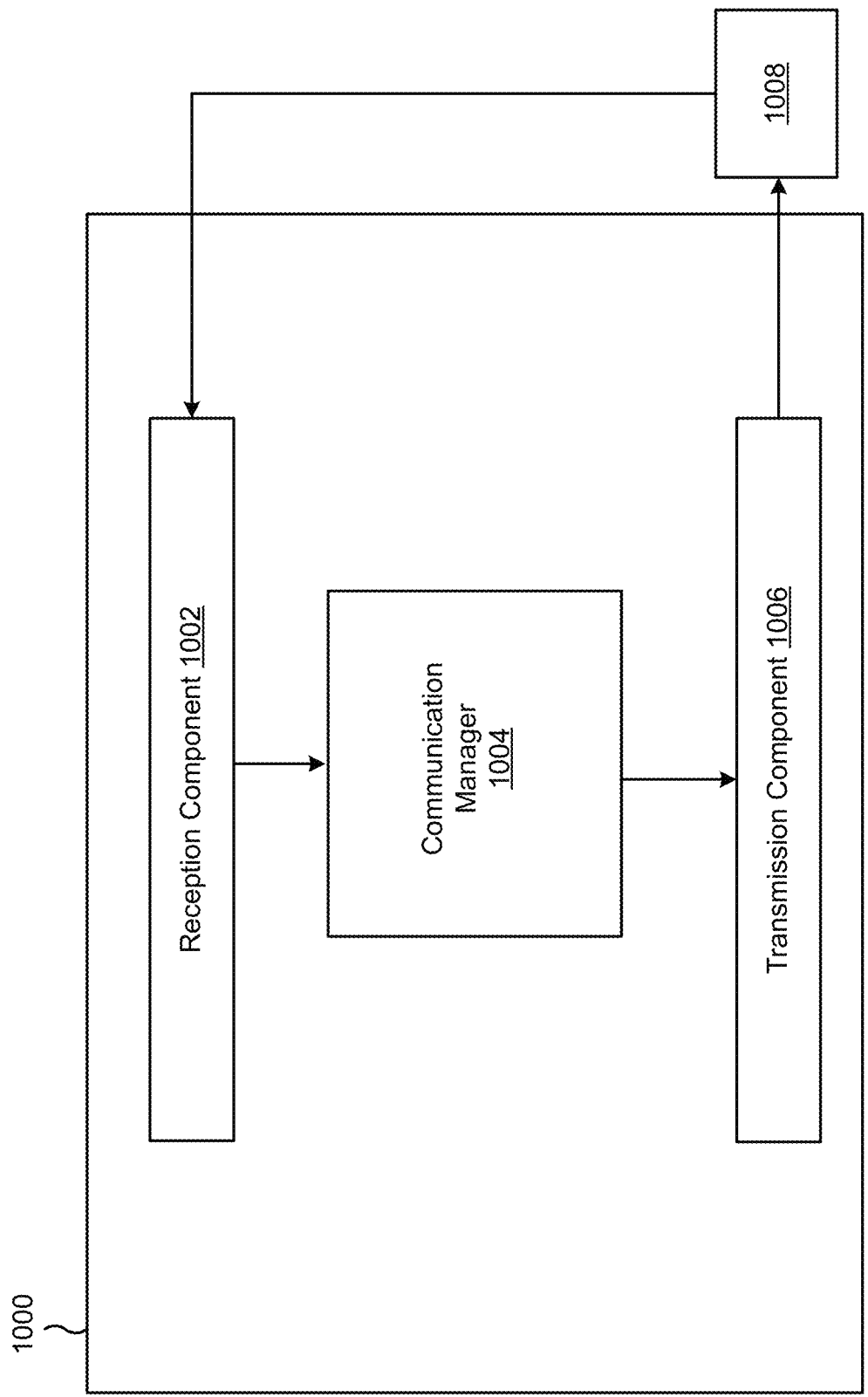

FIG. 10 is a block diagram of an example apparatus 1000 for wireless communication in accordance with the present disclosure. The apparatus 1000 may be, be similar to, include, or be included in a wireless communication device (e.g., wireless communication device 505 shown in FIG. 5). In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a client, a server, a UE, a base station, or another wireless communication device) using the reception component 1002 and the transmission component 1006.

In some aspects, the apparatus 1000 may be configured to perform one or more operations described herein in connection with FIG. 5. Additionally, or alternatively, the apparatus 1000 may be configured to perform one or more processes described herein, such as process 700 of FIG. 7. In some aspects, the apparatus 1000 may include one or more components of the base station described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the base station described above in connection with FIG. 2. In some aspects, the transmission component 1006 may be co-located with the reception component 1002 in a transceiver.

The communication manager 1004 may provide means for receiving an indication of a selection, by a UE operating using a first beam corresponding to a cell, of a second beam corresponding to the cell, wherein the selection is based at least in part on a set of beam information associated with the second beam, and wherein a first narrowband is associated with the first beam and a second narrowband is associated with the second beam; and communicating with the UE using the second beam. In some aspects, the communication manager 1004 may include a controller/processor, a memory, a scheduler, a communication unit, or a combination thereof, of the base station described above in connection with FIG. 2. In some aspects, the communication manager 1004 may include the reception component 1002 and/or the transmission component 1006, among other examples. In some aspects, the means provided by the communication manager 1004 may include, or be included within means provided by the reception component 1002 and/or the transmission component 1006, among other examples.

In some aspects, the communication manager 1004 and/or one or more components thereof may include or may be implemented within hardware. In some aspects, the communication manager 1004 and/or one or more components thereof may include or may be implemented within a controller/processor, a memory, or a combination thereof, of the BS 110 described above in connection with FIG. 2.

In some aspects, the communication manager 1004 and/or one or more components thereof may be implemented in code (e.g., as software or firmware stored in a memory). For example, the communication manager 1004 and/or a component (or a portion of a component) of the communication manager 1004 may be implemented as instructions or code stored in a non-transitory computer-readable medium and executable by a controller or a processor to perform the functions or operations of the communication manager 1004 and/or the component. If implemented in code, the functions of the communication manager 1004 and/or a component may be executed by a controller/processor, a memory, a scheduler, a communication unit, or a combination thereof, of the BS 110 described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
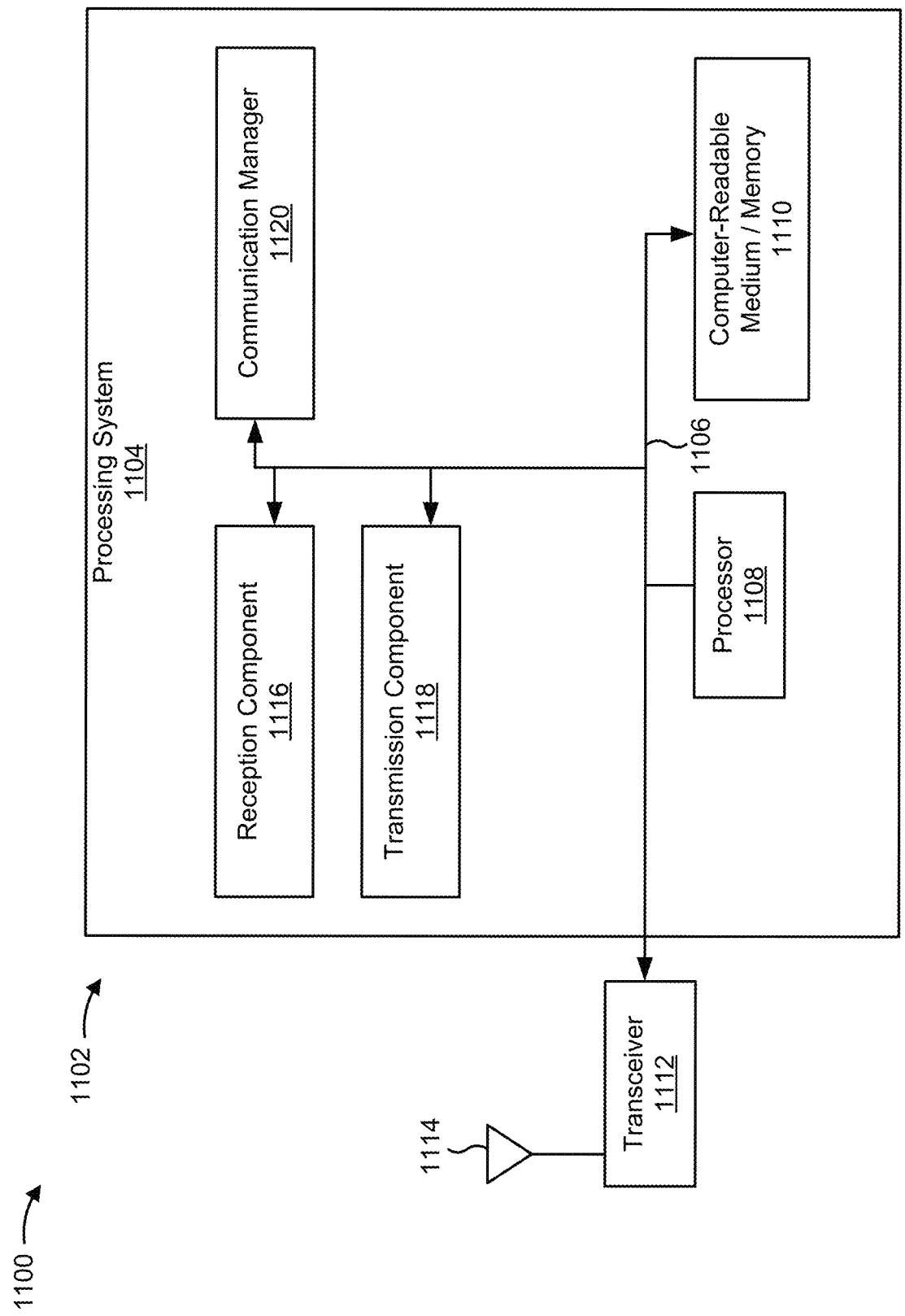

FIG. 11 is a diagram illustrating an example 1100 of a hardware implementation for an apparatus 1102 employing a processing system 1104. The apparatus 1102 may be, be similar to, include, or be included in the apparatus 1000 shown in FIG. 10.

The processing system 1104 may be implemented with a bus architecture, represented generally by the bus 1106. The bus 1106 may include any number of interconnecting buses and bridges depending on the specific application of the processing system 1104 and the overall design constraints. The bus 1106 links together various circuits including one or more processors and/or hardware components, represented by a processor 1108, the illustrated components, and the computer-readable medium/memory 1110. The bus 1106 may also link various other circuits, such as timing sources, peripherals, voltage regulators, and/or power management circuits, among other examples.

The processing system 1104 may be coupled to a transceiver 1112. The transceiver 1112 is coupled to one or more antennas 1114. The transceiver 1112 provides a means for communicating with various other apparatuses over a transmission medium. The transceiver 1112 receives a signal from the one or more antennas 1114, extracts information from the received signal, and provides the extracted information to the processing system 1104, specifically a reception component 1116. In addition, the transceiver 1112 receives information from the processing system 1104, specifically a transmission component 1118, and generates a signal to be applied to the one or more antennas 1114 based at least in part on the received information. The processing system 1104 may include a communication manager 1120 configured to manage one or more operations associated with communications described herein.

The processor 1108 is coupled to the computer-readable medium/memory 1110. The processor 1108 is responsible for general processing, including the execution of software stored on the computer-readable medium/memory 1110. The software, when executed by the processor 1108, causes the processing system 1104 to perform the various functions described herein in connection with a server. The computer-readable medium/memory 1110 may also be used for storing data that is manipulated by the processor 1108 when executing software. The processing system 1104 may include any number of additional components not illustrated in FIG. 11. The components illustrated and/or not illustrated may be software modules running in the processor 1108, resident/stored in the computer-readable medium/memory 1110, one or more hardware modules coupled to the processor 1108, or some combination thereof.

In some aspects, the processing system 1104 may be a component of the UE 120 and may include the memory 282 and/or at least one of the TX MIMO processor 266, the RX processor 258, and/or the controller/processor 280. In some aspects, the apparatus 1102 for wireless communication provides means for receiving an indication of a selection, by a UE operating using a first beam corresponding to a cell, of a second beam corresponding to the cell, wherein the selection is based at least in part on a set of beam information associated with the second beam, and wherein a first narrowband is associated with the first beam and a second narrowband is associated with the second beam; and communicating with the UE using the second beam. The aforementioned means may be one or more of the aforementioned components of the processing system 1104 of the apparatus 1102 configured to perform the functions recited by the aforementioned means. As described elsewhere herein, the processing system 1104 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

The following provides an overview of some Aspects of the present disclosure:

Aspect 1: A method of wireless communication performed by a user equipment (UE), comprising: selecting, while operating using a first beam corresponding to a cell, a second beam corresponding to the cell based at least in part on a set of beam information associated with the second beam, wherein a first narrowband is associated with the first beam and a second narrowband is associated with the second beam; and communicating with a wireless communication device that provides the cell using the second beam.

Aspect 2: The method of Aspect 1, wherein the set of beam information is stored in a memory of the UE.

Aspect 3: The method of Aspect 2, further comprising: accessing the set of beam information stored in the memory; and selecting the second narrowband based at least in part on the set of beam information.

Aspect 4: The method of Aspect 3, wherein selecting the second narrowband comprises selecting the second narrowband based at least in part on determining that a first physical cell identifier (PCID) associated with the first narrowband and a second PCID associated with the second narrowband match.

Aspect 5: The method of any of Aspects 1-4, further comprising receiving an indication of a beam identifier (ID) corresponding to the second beam.

Aspect 6: The method of Aspect 5, wherein the beam ID is carried in at least one of: a primary synchronization signal, a secondary synchronization signal, a master information block, or a system information block.

Aspect 7: The method of any of Aspects 1-6, wherein a first physical cell identifier (PCID) associated with the first narrowband does not match a second PCID associated with the second narrowband, and wherein selecting the second beam comprises: receiving a first master information block (MIB) associated with the first beam, wherein the first MIB indicates a first system information block 1 bandwidth reduced (SIB1-BR) scheduling; receiving a second MIB associated with the second beam, wherein the second MIB indicates a second SIB1-BR scheduling; and determining that the first SIB1-BR scheduling matches the second SIB1-BR scheduling, wherein selecting the second beam comprises selecting the second beam based at least in part on determining that the first SIB1-BR scheduling matches the second SIB1-BR scheduling.

Aspect 8: The method of any of Aspects 1-7, further comprising receiving a master information block (MIB) associated with the second beam, wherein the MIB indicates an index corresponding to at least one of: a paging narrowband list of a plurality of paging narrowband lists, or a physical random access channel (PRACH) narrowband of a plurality of PRACH narrowbands.

Aspect 9: The method of any of Aspects 1-8, further comprising: receiving a first master information block (MIB) associated with the first beam, wherein the first MIB is carried using a first frequency; and receiving a second MIB associated with the second beam, wherein the second MIB is carried using a second frequency that matches the first frequency.

Aspect 10: The method of any of Aspects 1-9, further comprising: receiving a first system information block (SIB) associated with the first beam, wherein the first SIB is carried using the first narrowband; and receiving a second SIB associated with the second beam, wherein the second SIB is carried using the second narrowband, wherein the second narrowband matches the first narrowband.

Aspect 11: The method of any of Aspects 1-10, further comprising: receiving a first paging message associated with the first beam, wherein the first paging message is carried using a first narrowband; and receiving a second paging message associated with the second beam, wherein the second paging message is carried using a second narrowband that does not match the first narrowband.

Aspect 12: The method of any of Aspects 1-11, further comprising: transmitting an uplink random access channel (PRACH) message associated with the first beam, wherein the uplink RACH message is carried using a first narrowband; and receiving a response RACH message associated with the second beam, wherein the response RACH message is carried using a second narrowband that does not match the first narrowband.

Aspect 13: The method of any of Aspects 1-12, further comprising: receiving a downlink random access channel (PRACH) message associated with the first beam, wherein the downlink RACH message is carried using a first narrowband; and transmitting a response RACH message associated with the second beam, wherein the response RACH message is carried using a second narrowband that does not match the first narrowband.

Aspect 14: The method of any of Aspects 1-13, wherein operating using the first beam comprises transmitting a first uplink communication using a first narrowband, and wherein communicating with the wireless communication device using the second beam comprises transmitting a second uplink communication using a second narrowband that does not match the first narrowband.

Aspect 15: The method of any of Aspects 1-14, wherein operating using the first beam comprises receiving a first downlink communication using a first narrowband, and wherein communicating with the wireless communication device using the second beam comprises receiving a second downlink communication using a second narrowband that does not match the first narrowband.

Aspect 16: The method of any of Aspects 1-15, wherein operating using the first beam comprises receiving a downlink communication using a first narrowband, and wherein communicating with the wireless communication device using the second beam comprises transmitting an uplink communication using a second narrowband that does not match the first narrowband.

Aspect 17: The method of any of Aspects 1-16, wherein the first beam corresponds to a first beam configuration and the second beam corresponds to a second beam configuration.

Aspect 18: The method of Aspect 17, wherein a third beam comprises the first beam configuration.

Aspect 19: The method of either of Aspects 17 or 18, wherein the first configuration comprises at least one of: an indication of a first physical cell identifier (PCID), an indication to transmit a first beam identifier (ID) in a first master information block (MIB), or an indication to transmit, using a first frequency, at least one of: a first primary synchronization signal (PSS), a first secondary synchronization signal (SSS), or the first MIB.

Aspect 20: The method of Aspect 19, wherein the second configuration comprises at least one of: an indication of the first PCID, an indication to transmit a second beam ID in a second MIB, or an indication to transmit, using a second frequency, at least one of: a second PSS, a second SSS, or the first MIB.

Aspect 21: The method of Aspect 17, wherein the first configuration comprises at least one of: an indication of a first physical cell identifier (PCID), an indication to transmit a first paging message using a first narrowband, an indication to transmit a first paging narrowband list, an indication to transmit a first random access channel (RACH) message using the first narrowband, or an indication to transmit, using a first frequency, at least one of: a first primary synchronization signal (PSS), a first secondary synchronization signal (SSS), or the first MIB.

Aspect 22: The method of Aspect 21, wherein the second configuration comprises at least one of: an indication of a second PCID, an indication to transmit a second paging message using a second narrowband, an indication to transmit a second paging narrowband list, an indication to transmit a second RACH message using the second narrowband, or an indication to transmit, using a first frequency, at least one of: a second primary synchronization signal (PSS), a second secondary synchronization signal (SSS), or a second MIB.

Aspect 23: The method of any of Aspects 1-22, further comprising identifying the second beam based at least in part on a frequency associated with the second beam and a physical cell identifier associated with the second beam.

Aspect 24: The method of any of Aspects 1-23, further comprising: receiving a master information block (MIB) associated with the second beam; and identifying the second beam based at least in part on the MIB.

Aspect 25: The method of Aspect 24, further comprising refraining from receiving a system information block associated with the second beam.

Aspect 26: The method of any of Aspects 1-25, further comprising receiving a paging message based at least in part on a last connected cell and a last connected beam.

Aspect 27: The method of any of Aspects 1-26, wherein the first beam corresponds to a first non-terrestrial device and the second beam corresponds to a second non-terrestrial device.

Aspect 28: The method of any of Aspects 1-27, further comprising: receiving a master information block (MIB) associated with the second beam; and determining, based at least in part on the MIB, that the second beam is associated with a non-terrestrial network.

Aspect 29: The method of Aspect 28, wherein a master information block associated with the second beam includes a physical channel hybrid automatic repeat request indicator channel (PHICH) configuration field, wherein the PHICH configuration field indicates a beam identifier associated with the second beam.

Aspect 30: The method of any of Aspects 1-29, wherein a first beam identifier (ID) corresponding to the first beam is associated with a first set of paging narrowbands, and wherein a second beam ID corresponding to the second beam is associated with a second set of paging narrowbands.

Aspect 31: The method of Aspect 30, further comprising: receiving an indication of the first set of paging narrowbands; receiving an indication of a paging narrowband offset associated with the second beam; and determining the second set of paging narrowbands based at least in part on the indication of the first set of paging narrowbands and the paging narrowband offset.

Aspect 32: The method of any of Aspects 1-31, wherein a first beam identifier (ID) corresponding to the first beam is associated with a first set of physical random access channel (PRACH) narrowbands, and wherein a second beam ID corresponding to the second beam is associated with a second set of PRACH narrowbands.

Aspect 33: The method of any of Aspects 1-32, further comprising receiving a mapping of a plurality of beam identifiers to at least one of: a plurality of paging narrowbands, or a plurality of physical random access channel narrowbands.

Aspect 34: The method of Aspect 33, wherein the mapping is carried using at least one of: a system information block, or a radio resource control message.

Aspect 35: The method of any of Aspects 1-34, wherein communicating with the wireless communication device using the second beam is based at least in part on a determination that a per-beam access barring mechanism condition is satisfied.

Aspect 36: The method of Aspect 35, further comprising receiving at least one system information block (SIB) prior to initiating a physical random access channel (PRACH) procedure, wherein the at least one SIB indicates a per-beam barring bitmap.

Aspect 37: The method of Aspect 36, wherein the bitmap is based at least in part on at least one of: a beam identifier, a paging narrowband index, or a PRACH narrowband index.

Aspect 38: The method of Aspect 35, wherein the per-beam access barring mechanism condition is based at least in part on a coverage enhancement level.

Aspect 39: The method of any of Aspects 1-38, wherein the cell is associated with a non-terrestrial network.

Aspect 40: A method of wireless communication performed by a wireless communication device, comprising: receiving an indication of a selection, by a user equipment (UE) operating using a first beam corresponding to a cell, of a second beam corresponding to the cell, wherein the selection is based at least in part on a set of beam information associated with the second beam, and wherein a first narrowband is associated with the first beam and a second narrowband is associated with the second beam; and communicating with the UE using the second beam.

Aspect 41: The method of Aspect 40, wherein the set of beam information is stored in a memory of the UE.

Aspect 42: The method of Aspect 41, wherein the selection comprises a selection of the second narrowband based at least in part on determining that a first physical cell identifier (PCID) associated with the first narrowband and a second PCID associated with the second narrowband match.

Aspect 43: The method of any of Aspects 40-42, further comprising transmitting an indication of a beam identifier (ID) corresponding to the second beam.

Aspect 44: The method of Aspect 43, wherein the beam ID is carried in at least one of: a primary synchronization signal, a secondary synchronization signal, a master information block, or a system information block.

Aspect 45: The method of any of Aspects 40-44, wherein a first physical cell identifier (PCID) associated with the first narrowband does not match a second PCID associated with the second narrowband, and wherein the method further comprises: transmitting a first master information block (MIB) associated with the first beam, wherein the first MIB indicates a first system information block 1 bandwidth reduced (SIB1-BR) scheduling; and transmitting a second MIB associated with the second beam, wherein the second MIB indicates a second SIB1-BR scheduling, wherein the selection of the second beam is based at least in part on a determination that the first SIB1-BR scheduling matches the second SIB1-BR scheduling.

Aspect 46: The method of any of Aspects 40-45, further comprising transmitting a master information block (MIB) associated with the second beam, wherein the MIB indicates an index corresponding to at least one of: a paging narrowband list of a plurality of paging narrowband lists, or a physical random access channel (PRACH) narrowband of a plurality of PRACH narrowbands.

Aspect 47: The method of any of Aspects 40-46, further comprising: transmitting a first master information block (MIB) associated with the first beam, wherein the first MIB is carried using a first frequency; and transmitting a second MIB associated with the second beam, wherein the second MIB is carried using a second frequency that matches the first frequency.

Aspect 48: The method of any of Aspects 40-47, further comprising: transmitting a first system information block (SIB) associated with the first beam, wherein the first SIB is carried using a first narrowband; and transmitting a second SIB associated with the second beam, wherein the second SIB is carried using a second narrowband that matches the first narrowband.

Aspect 49: The method of any of Aspects 40-48, further comprising: transmitting a first paging message associated with the first beam, wherein the first paging message is carried using a first narrowband; and transmitting a second paging message associated with the second beam, wherein the second paging message is carried using a second narrowband that does not match the first narrowband.

Aspect 50: The method of any of Aspects 40-49, further comprising: transmitting a downlink random access channel (PRACH) message associated with the first beam, wherein the downlink RACH message is carried using a first narrowband; and receiving a response RACH message associated with the second beam, wherein the response RACH message is carried using a second narrowband that does not match the first narrowband.

Aspect 51: The method of any of Aspects 40-50, further comprising: receiving an uplink random access channel (PRACH) message associated with the first beam, wherein the uplink RACH message is carried using a first narrowband; and transmitting a response RACH message associated with the second beam, wherein the response RACH message is carried using a second narrowband that does not match the first narrowband.

Aspect 52: The method of any of Aspects 40-51, wherein operating using the first beam comprises receiving a first uplink communication using a first narrowband, and wherein communicating with the UE using the second beam comprises receiving a second uplink communication using a second narrowband that does not match the first narrowband.

Aspect 53: The method of any of Aspects 40-52, wherein operating using the first beam comprises transmitting a first downlink communication using a first narrowband, and wherein communicating with the UE using the second beam comprises transmitting a second downlink communication using a second narrowband that does not match the first narrowband.

Aspect 54: The method of any of Aspects 40-53, wherein operating using the first beam comprises transmitting a downlink communication using a first narrowband, and wherein communicating with the UE using the second beam comprises receiving an uplink communication using a second narrowband that does not match the first narrowband.

Aspect 55: The method of any of Aspects 40-54, wherein the first beam corresponds to a first beam configuration and the second beam corresponds to a second beam configuration.

Aspect 56: The method of Aspect 55, wherein a third beam comprises the first beam configuration.

Aspect 57: The method of Aspect 55, wherein the first configuration comprises at least one of: an indication of a first physical cell identifier (PCID), an indication to transmit a first beam identifier (ID) in a first master information block (MIB), or an indication to transmit, using a first frequency, at least one of: a first primary synchronization signal (PSS), a first secondary synchronization signal (SSS), or the first MIB.

Aspect 58: The method of Aspect 57, wherein the second configuration comprises at least one of: an indication of the first PCID, an indication to transmit a second beam ID in a second MIB, or an indication to transmit, using a second frequency, at least one of: a second PSS, a second SSS, or the first MIB.

Aspect 59: The method of Aspect 57, wherein the first configuration comprises at least one of: an indication of a first physical cell identifier (PCID), an indication to transmit a first paging message using a first narrowband, an indication to transmit a first paging narrowband list, an indication to transmit a first random access channel (RACH) message using the first narrowband, or an indication to transmit, using a first frequency, at least one of: a first primary synchronization signal (PSS), a first secondary synchronization signal (SSS), or the first MIB.

Aspect 60: The method of Aspect 59, wherein the second configuration comprises at least one of: an indication of a second PCID, an indication to transmit a second paging message using a second narrowband, an indication to transmit a second paging narrowband list, an indication to transmit a second RACH message using the second narrowband, or an indication to transmit, using a first frequency, at least one of: a second primary synchronization signal (PSS), a second secondary synchronization signal (SSS), or a second MIB.

Aspect 61: The method of any of Aspects 40-60, further comprising transmitting a master information block (MIB) associated with the second beam, wherein an identification of the second beam is based at least in part on the MIB.

Aspect 62: The method of any of Aspects 40-61, further comprising transmitting a paging message based at least in part on a last connected cell and a last connected beam.

Aspect 63: The method of any of Aspects 40-62, wherein the first beam corresponds to a first non-terrestrial device and the second beam corresponds to a second non-terrestrial device.

Aspect 64: The method of any of Aspects 40-63, further comprising transmitting a master information block (MIB) associated with the second beam, wherein a determination that the second beam is associated with a non-terrestrial network is based at least in part on the MIB.

Aspect 65: The method of Aspect 64, wherein a master information block associated with the second beam includes a physical channel hybrid automatic repeat request indicator channel (PHICH) configuration field, wherein the PHICH configuration field indicates a beam identifier associated with the second beam.

Aspect 66: The method of any of Aspects 40-65, wherein a first beam identifier (ID) corresponding to the first beam is associated with a first set of paging narrowbands, and wherein a second beam ID corresponding to the second beam is associated with a second set of paging narrowbands.

Aspect 67: The method of Aspect 66, further comprising: receiving an indication of the first set of paging narrowbands; and transmitting an indication of a paging narrowband offset associated with the second beam, wherein a determination of a second set of paging narrowbands is based at least in part on the indication of the first set of paging narrowbands and the paging narrowband offset.

Aspect 68: The method of any of Aspects 40-67, wherein a first beam identifier (ID) corresponding to the first beam is associated with a first set of physical random access channel (PRACH) narrowbands, and wherein a second beam ID corresponding to the second beam is associated with a second set of PRACH narrowbands.

Aspect 69: The method of any of Aspects 40-68, further comprising transmitting a mapping of a plurality of beam identifiers to at least one of: a plurality of paging narrowbands, or a plurality of physical random access channel narrowbands.

Aspect 70: The method of Aspect 69, wherein the mapping is carried using at least one of: a system information block, or a radio resource control message.

Aspect 71: The method of any of Aspects 40-70, wherein communicating with the UE using the second beam is based at least in part on a determination that a per-beam access barring mechanism condition is satisfied.

Aspect 72: The method of Aspect 71, further comprising transmitting at least one system information block (SIB) prior to initialization of a physical random access channel (PRACH) procedure, wherein the at least one SIB indicates a per-beam barring bitmap.

Aspect 73: The method of Aspect 72, wherein the bitmap is based at least in part on at least one of: a beam identifier, a paging narrowband index, or a PRACH narrowband index.

Aspect 74: The method of Aspect 72, wherein the per-beam access barring mechanism condition is based at least in part on a coverage enhancement level.

Aspect 75: The method of any of Aspects 40-74, wherein the cell is associated with a non-terrestrial network.

Aspect 76: An apparatus for wireless communication at a device, comprising a processor; memory coupled with the processor; and instructions stored in the memory and executable by the processor to cause the apparatus to perform the method of one or more of Aspects 1-39.

Aspect 77: A device for wireless communication, comprising a memory and one or more processors coupled to the memory, the one or more processors configured to perform the method of one or more of Aspects 1-39.

Aspect 78: An apparatus for wireless communication, comprising at least one means for performing the method of one or more of Aspects 1-39.

Aspect 79: A non-transitory computer-readable medium storing code for wireless communication, the code comprising instructions executable by a processor to perform the method of one or more of Aspects 1-39.

Aspect 80: A non-transitory computer-readable medium storing a set of instructions for wireless communication, the set of instructions comprising one or more instructions that, when executed by one or more processors of a device, cause the device to perform the method of one or more of Aspects 1-39.

Aspect 81: An apparatus for wireless communication at a device, comprising a processor; memory coupled with the processor; and instructions stored in the memory and executable by the processor to cause the apparatus to perform the method of one or more of Aspects 40-75.

Aspect 82: A device for wireless communication, comprising a memory and one or more processors coupled to the memory, the one or more processors configured to perform the method of one or more of Aspects 40-75.

Aspect 83: An apparatus for wireless communication, comprising at least one means for performing the method of one or more of Aspects 40-75.

Aspect 84: A non-transitory computer-readable medium storing code for wireless communication, the code comprising instructions executable by a processor to perform the method of one or more of Aspects 40-75.

Aspect 85: A non-transitory computer-readable medium storing a set of instructions for wireless communication, the set of instructions comprising one or more instructions that, when executed by one or more processors of a device, cause the device to perform the method of one or more of Aspects 40-75.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a transceiver;
at least one memory comprising instructions; and
one or more processors configured to execute the instructions to cause the UE to:
select, while operating using a first beam corresponding to a cell, a second beam corresponding to the cell based at least in part on a set of beam information associated with the second beam, wherein a first narrowband is associated with the first beam and a second narrowband is associated with the second beam;
communicate with a wireless communication device that provides the cell using the second beam;
receive, via the transceiver, a first master information block (MIB) associated with the first beam, wherein the first MIB is carried using a first frequency; and
receive, via the transceiver, a second MIB associated with the second beam,
wherein the second MIB is carried using a second frequency that matches the first frequency.

2. The UE of claim 1, wherein the one or more processors are further configured to execute the instructions to cause the UE to:
receive, via the transceiver, a master information block (MIB) associated with the second beam; and
identify the second beam based at least in part on the MIB.

3. The UE of claim 1, wherein the set of beam information is stored in the at least one memory of the UE, and wherein the one or more processors are further configured to execute the instructions to cause the UE to:
access the set of beam information stored in the at least one memory; and
select the second narrowband based at least in part on the set of beam information.

4. The UE of claim 3, wherein the one or more processors, to select the second narrowband, are configured to select the second narrowband based at least in part on determining that a first physical cell identifier (PCID) associated with the first narrowband and a second PCID associated with the second narrowband match.

5. The UE of claim 1, wherein the one or more processors are further configured to execute the instructions to cause the UE to receive the indication of the beam ID corresponding to the second beam, wherein the beam ID is carried in at least one of:
a primary synchronization signal,
a secondary synchronization signal,
a master information block, or
a system information block.

6. The UE of claim 1, wherein a first physical cell identifier (PCID) associated with the first narrowband does not match a second PCID associated with the second narrowband, and wherein the one or more processors, to select the second beam, are configured to:
receive, via the transceiver, a first master information block (MIB) associated with the first beam, wherein the first MIB indicates a first system information block 1 bandwidth reduced (SIB1-BR) scheduling; and
receive, via the transceiver, a second MIB associated with the second beam, wherein the second MIB indicates a second SIB1-BR scheduling,
wherein selecting the second beam comprises selecting the second beam based at least in part on the first SIB1-BR scheduling matches the second SIB1-BR scheduling.

7. The UE of claim 1, wherein the one or more processors are further configured to execute the instructions to cause the UE to receive a master information block (MIB) associated with the second beam, wherein the MIB indicates an index corresponding to at least one of:
a paging narrowband list of a plurality of paging narrowband lists, or
a physical random access channel (PRACH) narrowband of a plurality of PRACH narrowbands.

8. The UE of claim 1, wherein the one or more processors are further configured to execute the instructions to cause the UE to:
receive, via the transceiver, a first system information block (SIB) associated with the first beam, wherein the first SIB is carried using the first narrowband; and receive, via the transceiver, a second SIB associated with the second beam, wherein the second SIB is carried using the second narrowband, wherein the second narrowband matches the first narrowband.

9. The UE of claim 1, wherein the one or more processors are further configured to execute the instructions to cause the UE to:
transmit, via the transceiver, an uplink random access channel (RACH) message associated with the first beam, wherein the uplink RACH message is carried using a first narrowband; and
receive, via the transceiver, a response RACH message associated with the second beam, wherein the response RACH message is carried using a second narrowband that does not match the first narrowband.

10. The UE of claim 1, wherein the one or more processors are further configured to execute the instructions to cause the UE to:
receive, via the transceiver, a downlink random access channel (RACH) message associated with the first beam, wherein the downlink RACH message is carried using a first narrowband; and
transmit, via the transceiver, a response message associated with the second beam, wherein the response message is carried using a second narrowband that does not match the first narrowband.

11. The UE of claim 1, wherein the one or more processors, to operate using the first beam, are configured to transmit a first uplink communication using a first narrowband, and wherein the one or more processors, to communicate with the wireless communication device using the second beam, are configured to transmit a second uplink communication using a second narrowband that does not match the first narrowband.

12. The UE of claim 1, wherein the one or more processors, to operate using the first beam, are configured to receive a first downlink communication using a first narrowband, and wherein the one or more processors, to communicate with the wireless communication device using the second beam, are configured to receive a second downlink communication using a second narrowband that does not match the first narrowband.

13. The UE of claim 1, wherein the one or more processors, to operate using the first beam, are configured to receive a downlink communication using a first narrowband, and wherein the one or more processors, to communicate with the wireless communication device using the second beam, are configured to transmit an uplink communication using a second narrowband that does not match the first narrowband.

14. The UE of claim 1, wherein the one or more processors are further configured to execute the instructions to cause the UE to identify the second beam based at least in part on a frequency associated with the second beam and a physical cell identifier associated with the second beam.

15. The UE of claim 1, wherein a first beam identifier (ID) corresponding to the first beam is associated with a first set of paging narrowbands, and wherein a second beam ID corresponding to the second beam is associated with a second set of paging narrowbands.

16. The UE of claim 1, wherein a first beam identifier (ID) corresponding to the first beam is associated with a first set of physical random access channel (PRACH) narrowbands, and wherein a second beam ID corresponding to the second beam is associated with a second set of PRACH narrowbands.

17. The UE of claim 1, wherein the one or more processors are further configured to execute the instructions to cause the UE to receive a mapping of a plurality of beam identifiers to at least one of:
a plurality of paging narrowbands, or
a plurality of physical random access channel narrowbands.

18. The UE of claim 17, wherein the mapping is carried using at least one of:
a system information block, or
a radio resource control message.

19. The UE of claim 1, wherein the one or more processors, to communicate with the wireless communication device using the second beam, are configured to communicate based at least in part on a per-beam access barring mechanism condition is satisfied.

20. The UE of claim 1, wherein the cell is associated with a non-terrestrial network.

21. A wireless communication device, comprising:
a transceiver;
at least one memory comprising instructions; and
one or more processors configured to execute the instructions to cause the wireless communication device to:
receive, via the transceiver, an indication of a selection of a second beam corresponding to the cell, wherein:
the selection is based at least in part on a set of beam information associated with the second beam,
a first narrowband is associated with the first beam, and
a second narrowband is associated with the second beam; and
communicate with a user equipment (UE) using the second beam;
transmit, via the transceiver, a first master information block (MIB) associated with the first beam, wherein the first MIB is carried using a first frequency; and
transmit, via the transceiver, a second MIB associated with the second beam,
wherein the second MIB is carried using a second frequency that matches the first frequency.

22. The wireless communication device of claim 21, wherein a first physical cell identifier (PCID) associated with the first narrowband does not match a second PCID associated with the second narrowband, and wherein the one or more processors are further configured to execute the instructions to cause the UE to:
transmit, via the transceiver, a first master information block (MIB) associated with the first beam, wherein the first MIB indicates a first system information block 1 bandwidth reduced (SIB1-BR) scheduling; and
transmit, via the transceiver, a second MIB associated with the second beam, wherein the second MIB indicates a second SIB1-BR scheduling,
wherein the selection of the second beam is based at least in part on a the first SIB1-BR scheduling matches the second SIB1-BR scheduling.

23. The wireless communication device of claim 21, wherein the one or more processors are further configured to execute the instructions to cause the UE to transmit a master information block (MIB) associated with the second beam, wherein the MIB indicates an index corresponding to at least one of:
a paging narrowband list of a plurality of paging narrowband lists, or
a physical random access channel (PRACH) narrowband of a plurality of PRACH narrowbands.

24. The wireless communication device of claim 21, wherein the one or more processors are further configured to execute the instructions to cause the UE to:
- transmit, via the transceiver, a first system information block (SIB) associated with the first beam, wherein the first SIB is carried using a first narrowband; and
- transmit, via the transceiver, a second SIB associated with the second beam, wherein the second SIB is carried using a second narrowband that matches the first narrowband.

25. The wireless communication device of claim 21, wherein the one or more processors are further configured to execute the instructions to cause the UE to:
- receive, via the transceiver, an uplink random access channel (RACH) message associated with the first beam, wherein the uplink RACH message is carried using a first narrowband; and
- transmit, via the transceiver, a response RACH message associated with the second beam, wherein the response RACH message is carried using a second narrowband that does not match the first narrowband.

26. The wireless communication device of claim 21, wherein the one or more processors, to operate using the first beam, are configured to transmit a first downlink communication using a first narrowband, and wherein the one or more processors, to communicate with the UE using the second beam, are configured to receive a second uplink communication using a second narrowband that does not match the first narrowband.

27. A method of wireless communication performed at a user equipment (UE), comprising:
- selecting, while operating using a first beam corresponding to a cell, a second beam corresponding to the cell based at least in part on a set of beam information associated with the second beam, wherein a first narrowband is associated with the first beam and a second narrowband is associated with the second beam; and
- communicating with a wireless communication device that provides the cell using the second beam;
- receiving a first master information block (MIB) associated with the first beam, wherein the first MIB is carried using a first frequency; and
- receiving a second MIB associated with the second beam, wherein the second MIB is carried using a second frequency that matches the first frequency.

28. A method of wireless communication performed at a wireless communication device, comprising:
- receiving an indication of a selection, by a user equipment (UE) operating using a first beam corresponding to a cell, of a second beam corresponding to the cell, wherein:
  - the selection is based at least in part on a set of beam information associated with the second beam,
  - a first narrowband is associated with the first beam, and
  - a second narrowband is associated with the second beam; and
- communicating with the UE using the second beam;
- transmitting a first master information block (MIB) associated with the first beam, wherein the first MIB is carried using a first frequency; and
- transmitting a second MIB associated with the second beam, wherein the second MIB is carried using a second frequency that matches the first frequency.

29. The UE of claim 1, wherein the set of beam information comprises an indication of a beam identifier (ID) corresponding to the second beam.

30. The wireless communication device of claim 21, wherein the set of beam information comprises an indication of a beam identifier (ID) corresponding to the second beam.

* * * * *